US011226955B2

(12) United States Patent
Liu et al.

(10) Patent No.: US 11,226,955 B2
(45) Date of Patent: Jan. 18, 2022

(54) TECHNIQUES FOR ENABLING AND INTEGRATING IN-MEMORY SEMI-STRUCTURED DATA AND TEXT DOCUMENT SEARCHES WITH IN-MEMORY COLUMNAR QUERY PROCESSING

(71) Applicant: Oracle International Corporation, Redwood Shores, CA (US)

(72) Inventors: Zhen Hua Liu, San Mateo, CA (US); Aurosish Mishra, Belmont, CA (US); Shasank K. Chavan, Menlo Park, CA (US); Douglas J. McMahon, Redwood City, CA (US); Vikas Arora, Burlingame, CA (US); Hui Joe Chang, San Jose, CA (US); Shubhro Jyoti Roy, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 711 days.

(21) Appl. No.: 16/022,465

(22) Filed: Jun. 28, 2018

(65) Prior Publication Data

US 2020/0004736 A1    Jan. 2, 2020

(51) Int. Cl.
*G06F 16/30* (2019.01)
*G06F 16/23* (2019.01)
(Continued)

(52) U.S. Cl.
CPC ...... *G06F 16/2365* (2019.01); *G06F 16/2255* (2019.01); *G06F 16/2379* (2019.01); *G06F 16/2455* (2019.01)

(58) Field of Classification Search
CPC ...... G06F 16/22; G06F 16/31; G06F 16/2255; G06F 16/2365; G06F 16/2379; G06F 16/2455; G06F 16/81; G06F 16/84
See application file for complete search history.

(56) References Cited

U.S. PATENT DOCUMENTS 4,815,030 A    3/1989  Cross et al.
5,072,405 A   12/1991  Ramakrisha et al.
(Continued)

FOREIGN PATENT DOCUMENTS

CN    108052320 A    5/2018
EP    0743596 A2    11/1996
(Continued)

OTHER PUBLICATIONS

Article entitled "Investigating Memory Optimization of Hash-index for Next Generation Sequencing on Multi-core Architecture", by Wang et al., Copyright 2012 (Year: 2012).*

(Continued)

*Primary Examiner* — Mahesh H Dwivedi
(74) *Attorney, Agent, or Firm* — Hickman Becker Bingham Ledesma LLP

(57) ABSTRACT

A "hybrid derived cache" stores semi-structured data or unstructured text data in an in-memory mirrored form and columns in another form, such as column-major format. The hybrid derived cache may cache scalar type columns in column-major format. The structure of the in-memory mirrored form of semi-structured data or unstructured text data enables and/or enhances access to perform path-based and/or text based query operations. A hybrid derived cache improves cache containment for executing query operations. The in-memory mirrored form is used to compute queries in a transactionally consistent manner through the use of an invalid vector that used to determine when to retrieve the transactionally consistent persistent form of semi-structured data or unstructured text data in lieu of the in-memory form.

12 Claims, 16 Drawing Sheets

(51) Int. Cl.
*G06F 16/22* (2019.01)
*G06F 16/2455* (2019.01)

(56) References Cited

U.S. PATENT DOCUMENTS

| | | | |
|---|---|---|---|
| 5,325,292 A | 6/1994 | Crockett | |
| 5,446,885 A | 8/1995 | Moore et al. | |
| 5,625,820 A | 4/1997 | Hermsmeier et al. | |
| 5,680,602 A | 10/1997 | Bloem et al. | |
| 5,778,350 A | 7/1998 | Adams et al. | |
| 5,870,552 A | 2/1999 | Dozier et al. | |
| 5,873,075 A | 2/1999 | Cochrane et al. | |
| 5,873,084 A | 2/1999 | Brancho et al. | |
| 5,873,091 A | 2/1999 | Garth et al. | |
| 5,899,986 A | 5/1999 | Ziauddin | |
| 5,926,812 A | 7/1999 | Hilsenrath | |
| 5,940,832 A | 8/1999 | Hamada et al. | |
| 5,970,244 A | 10/1999 | Nagahashi et al. | |
| 5,991,733 A | 11/1999 | Aleia et al. | |
| 6,003,022 A | 12/1999 | Eberhard et al. | |
| 6,021,443 A | 2/2000 | Bracho et al. | |
| 6,035,306 A | 3/2000 | Lowenthal et al. | |
| 6,038,601 A | 3/2000 | Lambert et al. | |
| 6,067,540 A | 5/2000 | Ozbutun et al. | |
| 6,070,160 A | 5/2000 | Geary | |
| 6,085,191 A | 7/2000 | Fisher et al. | |
| 6,115,703 A | 9/2000 | Bireley | |
| 6,122,639 A | 9/2000 | Babu et al. | |
| 6,122,664 A | 9/2000 | Boukobza et al. | |
| 6,173,154 B1 | 1/2001 | Kucinski et al. | |
| 6,189,022 B1 | 2/2001 | Binns | |
| 6,195,676 B1 | 2/2001 | Spix et al. | |
| 6,223,171 B1 | 4/2001 | Chaudhuri et al. | |
| 6,233,575 B1 | 5/2001 | Agrawal et al. | |
| 6,285,997 B1 | 9/2001 | Carey et al. | |
| 6,321,218 B1 | 11/2001 | Guay et al. | |
| 6,353,828 B1 | 3/2002 | Ganesh | |
| 6,356,880 B1 | 3/2002 | Goossens et al. | |
| 6,370,552 B1 | 4/2002 | Agarwal et al. | |
| 6,377,943 B1 | 4/2002 | Jakobsson | |
| 6,389,430 B1 | 5/2002 | Parker | |
| 6,401,090 B1 | 6/2002 | Bailis et al. | |
| 6,405,191 B1 | 6/2002 | Bhatt et al. | |
| 6,427,146 B1 | 7/2002 | Chu | |
| 6,442,568 B1 | 8/2002 | Velasco et al. | |
| 6,470,330 B1 | 10/2002 | Das et al. | |
| 6,502,093 B1 | 12/2002 | Bhatt et al. | |
| 6,519,580 B1 | 2/2003 | Johnson et al. | |
| 6,539,371 B1 | 3/2003 | Bleizeffer et al. | |
| 6,553,369 B1 | 4/2003 | Guay et al. | |
| 6,564,207 B1 | 5/2003 | Abdoh | |
| 6,604,093 B1 | 8/2003 | Etzion et al. | |
| 6,604,100 B1 | 8/2003 | Fernandez et al. | |
| 6,665,684 B2 | 12/2003 | Zait et al. | |
| 6,681,383 B1 | 1/2004 | Pastor et al. | |
| 6,691,155 B2 | 2/2004 | Gottfried | |
| 6,757,675 B2 | 6/2004 | Aiken et al. | |
| 6,763,357 B1 | 7/2004 | Deshpande | |
| 6,766,318 B1 | 7/2004 | Guay et al. | |
| 6,850,893 B2 | 2/2005 | Lipkin et al. | |
| 6,865,567 B1 | 3/2005 | Commen | |
| 6,901,410 B2 | 5/2005 | Marron et al. | |
| 6,917,946 B2 | 7/2005 | Corl, Jr. et al. | |
| 7,092,954 B1 | 8/2006 | Ramesh | |
| 7,127,467 B2 | 10/2006 | Yalamanchi et al. | |
| 7,257,569 B2 | 8/2007 | Elder | |
| 7,480,302 B2 | 1/2009 | Choi | |
| 7,499,915 B2 | 3/2009 | Chandrasekar | |
| 7,512,589 B2 | 3/2009 | Stokkan et al. | |
| 7,636,731 B2 | 12/2009 | Curanes et al. | |
| 7,644,014 B2 | 1/2010 | Viswanath | |
| 7,877,400 B1 | 1/2011 | Matthew | |
| 8,086,606 B1 | 12/2011 | Xu | |
| 8,549,006 B2 | 10/2013 | Amer-Yahia et al. | |
| 8,578,261 B1 | 11/2013 | Gupta | |
| 9,183,254 B1 | 11/2015 | Cole | |
| 9,317,529 B2 | 4/2016 | Bamba | |
| 9,460,176 B2 | 10/2016 | Kwon | |
| 9,519,680 B2 | 12/2016 | Hu et al. | |
| 10,204,135 B2 | 2/2019 | Mishra et al. | |
| 10,333,709 B2 | 6/2019 | Dictos | |
| 2001/0047270 A1 | 11/2001 | Gusick et al. | |
| 2002/0062475 A1 | 5/2002 | Iborra et al. | |
| 2002/0152149 A1 | 10/2002 | Tanaka | |
| 2003/0046421 A1 | 3/2003 | Horvitz et al. | |
| 2003/0097365 A1 | 5/2003 | Stickler | |
| 2003/0120642 A1 | 6/2003 | Egilsson et al. | |
| 2003/0182268 A1 | 9/2003 | Lal | |
| 2003/0187858 A1 | 10/2003 | Kirk | |
| 2003/0187862 A1 | 10/2003 | Brobast | |
| 2003/0236834 A1 | 12/2003 | Gottfried | |
| 2004/0073541 A1* | 4/2004 | Lindblad | G06F 16/81 |
| 2004/0181543 A1 | 9/2004 | Wu et al. | |
| 2004/0193575 A1 | 9/2004 | Chen et al. | |
| 2005/0044089 A1 | 2/2005 | Wu | |
| 2005/0055334 A1 | 3/2005 | Krishnamurthy | |
| 2005/0203940 A1 | 9/2005 | Farrar et al. | |
| 2005/0222978 A1 | 10/2005 | Drory et al. | |
| 2005/0228791 A1 | 10/2005 | Thusoo | |
| 2005/0268171 A1 | 12/2005 | House et al. | |
| 2006/0015482 A1 | 1/2006 | Beyer | |
| 2006/0020616 A1 | 1/2006 | Hardy | |
| 2006/0036657 A1 | 2/2006 | Cheslow | |
| 2006/0047696 A1 | 3/2006 | Larson | |
| 2006/0047719 A1 | 3/2006 | Hershkovich | |
| 2006/0064432 A1 | 3/2006 | Pettovello | |
| 2006/0083227 A1 | 4/2006 | Eldar | |
| 2006/0085592 A1 | 4/2006 | Ganguly et al. | |
| 2006/0230017 A1 | 10/2006 | Larson | |
| 2006/0242694 A1 | 10/2006 | Gold et al. | |
| 2006/0288026 A1 | 12/2006 | Zayas et al. | |
| 2006/0288030 A1 | 12/2006 | Lawrence | |
| 2007/0043757 A1 | 2/2007 | Benton et al. | |
| 2007/0112736 A1 | 5/2007 | Okamoto et al. | |
| 2007/0179934 A1 | 8/2007 | Basov et al. | |
| 2007/0022623 A1 | 9/2007 | Gong et al. | |
| 2007/0255748 A1 | 11/2007 | Ferragina | |
| 2007/0288718 A1* | 12/2007 | Cholleti | G06F 12/1009 711/170 |
| 2008/0010256 A1 | 1/2008 | Lindblad | |
| 2008/0059412 A1 | 3/2008 | Tarin | |
| 2008/0065596 A1 | 3/2008 | Shadmon | |
| 2008/0120274 A1 | 5/2008 | Curanes et al. | |
| 2008/0120275 A1 | 5/2008 | Cruanes et al. | |
| 2008/0120283 A1 | 5/2008 | Liu | |
| 2008/0177722 A1 | 7/2008 | Lohman | |
| 2008/0189303 A1 | 8/2008 | Bush et al. | |
| 2008/0243799 A1 | 10/2008 | Rozich | |
| 2008/0281801 A1 | 11/2008 | Larson et al. | |
| 2009/0063538 A1 | 3/2009 | Chitrapura | |
| 2009/0150366 A1 | 6/2009 | Basu | |
| 2009/0177960 A1 | 7/2009 | Lemoine | |
| 2009/0307241 A1 | 12/2009 | Schimunek et al. | |
| 2010/0325169 A1 | 12/2010 | Loh | |
| 2011/0106843 A1 | 5/2011 | Pan | |
| 2011/0113036 A1 | 5/2011 | Idicula et al. | |
| 2011/0179016 A1 | 7/2011 | Narula | |
| 2011/0264687 A1 | 10/2011 | Surtani | |
| 2012/0036133 A1 | 2/2012 | Chen et al. | |
| 2012/0221604 A1 | 8/2012 | Gao | |
| 2013/0151524 A1* | 6/2013 | McKenney | G06F 16/9014 707/737 |
| 2014/0032615 A1 | 1/2014 | Hammerschmidt et al. | |
| 2014/0052713 A1* | 2/2014 | Schauer | G06F 16/24561 707/722 |
| 2014/0095519 A1 | 4/2014 | Liu et al. | |
| 2014/0195503 A1 | 7/2014 | Kao | |
| 2014/0258266 A1 | 9/2014 | Cruanes | |
| 2015/0134670 A1* | 5/2015 | Liu | G06F 16/2246 707/741 |
| 2015/0347512 A1 | 12/2015 | Luo | |
| 2016/0179836 A1 | 6/2016 | Guo | |
| 2016/0294651 A1 | 10/2016 | Renna | |
| 2016/0350347 A1* | 12/2016 | Das | G06F 12/023 |

(56) References Cited

U.S. PATENT DOCUMENTS

| | | |
|---|---|---|
| 2017/0017683 A1 | 1/2017 | Fourny et al. |
| 2017/0031975 A1* | 2/2017 | Mishra ............... G06F 16/2282 |
| 2017/0060912 A1* | 3/2017 | Liu ..................... G06F 16/2246 |
| 2017/0060973 A1* | 3/2017 | Liu ..................... G06F 16/215 |
| 2018/0011893 A1* | 1/2018 | Kimura ............... G06F 16/9027 |
| 2018/0075105 A1 | 3/2018 | Chavan et al. |
| 2018/0089261 A1* | 3/2018 | Li ...................... G06F 16/2456 |
| 2018/0268000 A1 | 9/2018 | McManus |
| 2019/0220461 A1 | 7/2019 | Chavan |
| 2019/0243926 A1* | 8/2019 | Kadwe ............... G06F 16/2255 |
| 2019/0286722 A1* | 9/2019 | Barov ................. G06F 16/252 |
| 2020/0210398 A1 | 7/2020 | Liu |
| 2021/0081389 A1 | 3/2021 | Liu et al. |
| 2021/0081422 A1 | 3/2021 | Lee |
| 2021/0081428 A1 | 3/2021 | Ravada |

FOREIGN PATENT DOCUMENTS

| | | |
|---|---|---|
| EP | 0 959 416 A2 | 11/1999 |
| GB | 2 274 182 A | 7/1994 |
| GB | 2 354 847 A | 4/2001 |
| GB | 2 354 848 A | 4/2001 |
| JP | 05089143 | 4/1993 |
| JP | 06319024 | 11/1994 |
| WO | WO 98/33131 A1 | 7/1998 |
| WO | WO 01/08048 A1 | 2/2001 |
| WO | WO 01/88795 A1 | 11/2001 |
| WO | WO 03098479 A | 5/2003 |
| WO | WO 03/107222 A1 | 12/2003 |
| WO | WO 03/107222 A1 | 12/2003 |
| WO | WO 2008/091705 A2 | 7/2008 |
| WO | WO 2015/041967 A1 | 3/2015 |
| WO | WO 2015/069941 | 5/2015 |
| WO | WO 2015/069941 A1 | 5/2015 |
| WO | WO 2017/070188 A1 | 4/2017 |

OTHER PUBLICATIONS

McHugh et al., "Lore: A Database Management System for Semistructured Data", SIGMOD, vol. 26 No. 3, dated Sep. 3, 1997, 14 pages.

Liu, U.S. Appl. No. 13/783,141, filed Mar. 1, 2013, Office Action, dated Nov. 6, 2019.

Anonymous:, "Intverted Index—Wikipedia", dated Jan. 9, 2016, https://en.wikipedia.org/w/index.php?title=Inverted_index&oldid=698960983, 4 pages.

Shukla et al., "Schema-Agnostic Indexing with Azure DocumentDB", Proceedings of the VLDB Endowment, vol. 8, No. 12, Copyright 2015 VLDB, 12 pages.

Oracle Database, "Introduction to Simple Oracle Document Access (SODA)", 18c E86033-04, dated Aug. 2018, 96 pages.

Li et al., "Closing the functional and Performance Gap between SQL and NoSQL", ACM 978-1-4503-3531-7, dated Jun. 26, 2016, 12 pages.

Kleppmann et al., "A Conflict-Free Replicated JSON Datatype", dated Aug. 15, 2017, 17 pages.

Chasseur et al., "Enabling JSON Document Stores in Relational Systems", WebDB dated 2013, New York, New York, USA, 16 pages.

Liu, U.S. Appl. No. 15/162,235, filed May 23, 2016, Notice of Allowance, dated Jul. 1, 2019.

Liu, U.S. Appl. No. 13/783,141, filed Mar. 1, 2013, Interview Summary, dated Jul. 12, 2019.

Mishra, U.S. Appl. No. 15/146,799, filed May 4, 2016, Office Action, dated Jun. 14, 2018.

Liu, et al., U.S. Appl. No. 13/783,141, filed Mar. 1, 2013, Interview Summary, dated Jul. 10, 2017.

Liu, U.S. Appl. No. 13/783,141, filed Mar. 1, 2013, Advisory Action, dated Jul. 21, 2017.

Liu, U.S. Appl. No. 13/783,141, filed Mar. 1, 2013, Appeal Brief, Nov. 15, 2017.

Liu, U.S. Appl. No. 13/783,141, filed Mar. 1, 2013, Examiners Answers, dated Jun. 14, 2018.

Liu, U.S. Appl. No. 13/783,141, filed Mar. 1, 2013, Examiners Answers, dated Jul. 12, 2018.

Liu, U.S. Appl. No. 13/783,141, filed Mar. 1, 2013, Interview Summary, dated Nov. 13, 2017.

Liu, U.S. Appl. No. 13/783,141, filed Mar. 1, 2013, Final Office Action, dated Apr. 14, 2018.

Chavan, U.S. Appl. No. 15/146,801, filed May 4, 2016, Office Action, dated May 17, 2018.

Liu, U.S. Appl. No. 13/783,141, filed Mar. 1, 2013, Final Office Action, dated May 10, 2017.

U.S. Appl. No. 14/498,893, filed Sep. 26, 2014, Office Action, dated Aug. 12, 2016.

U.S. Appl. No. 13/783,141, filed Mar. 1, 2013, Office Action, dated Oct. 30, 2014.

U.S. Appl. No. 13/783,141, filed Mar. 1, 2013, Final Office Action, dated May 13, 2015.

U.S. Appl. No. 13/783,141, filed Mar. 1, 2013, Final Office Action, dated Jul. 8, 2016.

U.S. Appl. No. 13/783,141, filed Mar. 1, 2013, Interview Summary, dated Dec. 10, 2015.

U.S. Appl. No. 13/783,141, filed Mar. 1, 2013, Office Action, dated Sep. 3, 2015.

U.S. Appl. No. 13/783,141, filed Mar. 1, 2013, Office Action, dated Nov. 9, 2016.

U.S. Appl. No. 13/783,141, filed Mar. 1, 2013, Advisory Action, dated Jul. 17, 2015.

U.S. Appl. No. 14/498,893, filed Sep. 26, 2014, Notice of Allowance, dated Jan. 13, 2017.

Liu, U.S. Appl. No. 15/162,235, filed May 23, 2016, Office Action, dated May 3, 2018.

"22 SQL Access Using Resource_View and Path_View" Oracle® XML DB Developer's Guide 10g Release 2 (10.2) downloaded from the Internet on Jul. 15, 2009.

M.F. Wyle, "A Wide Area Network Information Filter," Proceedings International Conference on Artificial Intelligence Applications on Wall Street, Oct. 9, 1991, New York, US, Los Alamitos, CA Oct. 9, 1991, XP000534152, pp. 10-15.

Jim Binkley, et al: "Rama: An Architecture for Internet Information Filtering," Journal of Intelligent Information Systems, vol. 5, No. 2, Sep. 1, 1995 (Sep. 1, 1995), XP000617268, pp. 81-99.

Patrick A. O'Donnell, et al., "Deadlock-Free and Collision-Free Coordination of Two Robot Manipulators," 1989, IEEE, XP000041486, pp. 484-489.

Clara Nippl, et al., "Accelerating Profiling Services by Parallel Database Technology," undated, 9 pages.

Norman W. Paton, et al., "Active Database Systems," Mar. 1999, ACM Computing Surveys, vol. 31, No. 1., pp. 63-103.

Gianluigi Greco et al., Event Choice Datalog: A Logic Programming Language for Reasoning in Multiple Dimensions, dated 2004, ACM Press, pp. 238-249.

Poess, Meikel, et al., "New TPC Benchmarks for Decision Support and Web Commerce", ACM Press, retrieved from website: < http://www.sigmod.org/record/issues/0012/standards.pdf >, published Dec. 2000, 8 pages.

Selinger, P. Griffiths, et al., "Access Path Selection in a Relational Database Management System", ACM Inc., Proceedings of the 1979 ACM SIGMOD International Conference on the Management of Data, dated Oct. 2002, pp. 23-34.

Cyran, Michele, et al., "Oracle® Database Concepts", Oracle, 10g Release 2 (10.2), dated Oct. 2005, 16 pages.

publib.boulder.ibm.com, "Collecting statistics on a sample of the table data", DB2 Version 9 for Linux, UNIX, and Windows, retrieved from website: http://publib.boulder.ibm.com/infocenter/db2luw/v9/index.jsp?topic=/com.ibm.db2.udb.admin.doc/doc/c0011393.htm >, last updated Oct. 27, 2006, 1 page.

publib.boulder.ibm.com, "Runstats command", DB2 Version 9 for Linux, UNIX, and Windows, Retrieved from website: http://publib.boulder.ibm.com/infocenter/db2luw/v8/index.jsp?topic=/com.ibm.db2.udb.doc/core/r0001980.htm, last updated Oct. 27, 2006, 8 pages.

(56) References Cited

OTHER PUBLICATIONS

Microsoft, "SQL Server Query Optimization and Tuning", Microsoft TechNet, Retrieved from website: < http://www.microsoft.com/technet/community/chats/trans/sql/sql0909.mspx >, Published Sep. 9, 2003, 7 pages.
Hanson, Eric N., et al., "Statistics Used by the Query Optimizer in Microsoft SQL Server 2005", Microsoft TechNet, retrieved from website: < http://www.microsoft.com/technet/prodtechnol/sql/2005/qrystats.mspx >, printed Mar. 27, 2007, 13 pages.
Gibbons, Phillip B., et al., "Distinct Sampling for Highly-Accurate Answers to Distinct Values Queries and Event Reports", Proceedings of the $27^{th}$ VLDB Conference, 2001, 10 pages.
Othayoth, Raghunath, et al., "The Making of TPC-DS", Copyright 2006 VLDB Endowment, ACM, retrieved from website: < http://www.vldb.org/conf/2006/p1049-othayoth.pdf >, 10 pages.
Segev, A. et al., "Rule Activation Techniques in Active Database Systems", Journal of Intelligent Information Systems, 7(2):173-194, Oct. 1996, 23 pages.
IBM Corp., "Improved Rete Algorithm—Hashing Techniques Applied to Partial Match Memories," IBM Technical Disclosure Bulletin, vol. 35, No. 3, Aug. 1992, p. 149.
Charles L. Forgy, "Rete: A Fast Algorithm for the Many Pattern/Many Object Pattern Match Problem," *Artificial Intelligence*, 1982, pp. 17-37.
Marcos K. Aguilera, et al., "Matching Events in a Content-based Subscription System," 1999, Symposium on Principles of Distributed Computing, 9 pages.
Umeshwar Dayal, et al., "Active Database Systems," *Modern Database Systems: The Object Model, Interoperability, and Beyond*, Addison-Wesley, Reading, Massachusetts, Sep. 1994, 25 pages.
Jagannathan Srinivasan, et al., "Extensible Indexing: A Framework For Integrating Domain-Specific Indexing Schemes Into Oracle8i," Oracle Corporation, $16^{th}$ International Conference on Data Engineering, Feb. 28-Mar. 3, 2000, San Diego, California, 10 pages.
Patrick O'Neil, et al., "Improved Query Performance with Variant Indexes," SIGMOD '97 May 1997, Tucson, Arizona, USA, pp. 1-12.
Eric N. Hanson, et al., "Optimized Rule Condition Testing in Ariel using Gator Networks," Oct. 23, 1995, University of Florida, TR-95-027, pp. 1-24.
Grosof, Benjamin N. et al., "Sweet Deal: Representing Agent Contracts with Exceptions using XML Rules. Ontologies, and Process Descriptions," XP002354519, pp. 340-348.
Bea, :Using Expressions and Conditions, WebLogic Process Integrator Release 1.1, 2000, located on the internet at <http://e-docs.bea.com/wlpi/wlpi11/studio/ch6.htm>, retrieved on Dec. 29, 2005, 12 pages.
Chamberlain, Don, "Query Languages and XML," PowerPoint Presentation, IBM Almaden Research Center, Dec. 2000, located on the internet at <http://www-db.sc.wisc.edu/dbseminar/fall00/talks/chamberlain>, 26 pages.
Chamberlain, Don et al., "XQuery: A Query Language for XML," W3C Working Draft, Feb. 15, 2001, located on the internet at <http://www.w3.org/TR/2001/WD-xquery-20010215/>, retrieved on Dec. 29, 2005, 83 pages.
Clark, James et al., "XML Path Language (XPath), Version 1.0," W3C, 1999, located on the internet at <http://www.w3.org/TR/xpath.html>, retrieved on Dec. 29, 2005, 37 pages.
Krishnaprasad, Muralidhar et al., "Query Rewrite in Oracle XML DB," Proceeding of the $30^{th}$ VLDB Conference, 2004, pp. 1134-1145.
Unknown Author, unknown title, located on the internet at <www.cs.uku.fi/kilpelai/RDK01/lectures/Xquery.pdf>, 2001, 10 pages.
Kei Kurakawa et al., "Life Cycle Design Support Based on Environmental Information Sharing," IEEE, Feb. 1-3, 1999, Proceedings EcoDesign '99, First International Symposium, pp. 138-142.
Oliver Gunther, et al., "MMM: A Web-Based System for Sharing Statistical Computing Modules," IEEE, May-Jun. 1997, vol. 1, Issue 3, pp. 59-68.
Chavan, U.S. Appl. No. 16/365,271, filed Mar. 26, 2019, Interview Summary, dated Jan. 26, 2021.
Chavan, U.S. Appl. No. 16/365,271, filed Mar. 26, 2019, Office Action, dated Dec. 9, 2020.
Zhou et al., "Efficient Exploitation of Similar Subexpressions for Query Processing", Acm Sigmond, dated Jan. 1, 2007, 12 pages.
Zemmar et al., "A Survery of Indexing Techniques In Natives XML Databases", Inernational Arab Conference on Information Technology, dated Dec. 11, 2011, 8 pages.
Wikipedia, the free encyclopedia, "Protocol Buffers", last viewed on Dec. 28, 2015, https://en.wikipedia.org/wiki/Protocol_Buffers, 3 pages.
Wikipedia, the free encyclopedia, "BSON", last viewed on Dec. 28, 2015, https://en.wikipedia.org/wiki/BSON, 3 pages.
Wikipedia, the free encyclopedia, "Apache Avro", https://en.wikipedia.org/wiki/Apache_Avro, last viewed on Dec. 28, 2015, 2 pages.
Roth et al., "Don't' Scrap It Wrap it!, A Wrapper Architecture for Legacy Data Sources", Proceedings of the International Conference on Very Largedata Bases, dated Aug. 26, 1997, 10 pages.
Milena G Ivanova et al., "An Architecture for Recycling Intermediates in a Column-Store", SIGMOD-PODS, dated Jun. 29, 2009, 12 pages.
McHugh et al., "Lore: A Database Management System for Semistructured Data", SIGMOD Record, vol. 26, No. 3, Sep. 1997, 14 pages.
Mathis et al., "XML Indexing and Storage: Fulfilling the Wish List", Computer Science Res Dev. Springer Published Online Feb. 1, 2012, 18 pages.
Kaushik et al., "On the Integration of Structure Indexes and Inverted Lists", SIGMOD dated Jun. 13-18, 2004, AMC, 12 pages.
Candillier et al., "Mining XML Documents" In: Data Mining Patterns: New Methods and Applications, dated Nov. 19, 2007, IGI Global, 28 pages.
Anonymous: "Oracle Database In-Memory: Powering the Real-Time Enterprise", dated Dec. 31, 2014, 9 pages.
Abello et al., "Data Warehousing, Handbook of Massive Datasets", dated Apr. 1, 2002, Springer, 4 pages.
Liu, U.S. Appl. No. 13/783,141, filed Mar. 1, 2013, Notice of Allowance, dated Aug. 6, 2020.
Chavan, U.S. Appl. No. 15/146,801, filed May 4, 2016, Advisory Action, dated Feb. 5, 2019.
Liu, U.S. Appl. No. 13/783,141, filed Mar. 1, 2013, Final Office Action, dated Apr. 17, 2019.
Chavan, U.S. Appl. No. 15/146,801, filed May 4, 2016, Notice of Allowance, dated Apr. 16, 2019.
Wikipedia, "B+ Tree", dated Sep. 25, 2012, https://en.wikipedia.org/windex.php?title=B+_tree&oldid=514568173, 6 pages.
Kotsakis, Evangelos, "XSD: A Hierarchical Access Method for Indexing XML Schemata", Knowledge and Information Systems dated 2002, 34 pages.
Mishra, U.S. Appl. No. 15/146,799, filed May 4, 2016, Notice of Allowance, dated Sep. 28, 2018.
Lui, U.S. Appl. No. 15/162,235, filed May 23, 2016, Interview Summary, dated Oct. 2, 2018.
Liu, U.S. Appl. No. 15/162,235, filed May 23, 2016, Final Office Action, dated Oct. 2, 2018.
Manber et al., "GLIMPSE: A Tool to Search Through Entire File Systems", TR 93-34, dated Oct. 1993, 11 pages.
Amazon Ion, "Doc/Specification", http://amzn.github.io/ion-docs/docs/spec.html, dated Aug. 20, 2019, 13 pages.
Arora et al., "Modeling and Querying Data in Mongo DB", International Journal of Scientific & Engineering Research, vol. 4, Issue 7, Jul. 2013, 4 pages.
Biatecki et al., "Apache Lucene 4", SIGIR 2012 Workshop on Open Source Information Retrieval. Dated Aug. 16, 2012, Portland, OR USA., 8 pages.
Boicea et al., "MongoDB vs Oracle—database comparison", dated Sep. 2012, 7 pages.
Cai et al., "Integrated Querying of SQL database data and S3 data in Amazon Redshift", IEEE, dated 2018, 9 pages.
GitHub, "Parquet", parquet-format/README.md, last viewed on Jul. 15, 2020, https://github.com/apache/parquet-format/blob/f1de77d31936f4d50f1286676a0034b6339918ee/README.md 9 pages.

(56) References Cited

OTHER PUBLICATIONS

GitHub.com, "Analytics querying performance (aka, think about what to do with analytics)", https://github.com/18F/api.data.gov/issues/235, dated May 26, 2015, 27 pages.
IMB, "BSON and JSON Built-in Opaque Data Types", https://www.ibm.com/support/knowledgecenter/en/SSGU8G_12.1.0/com.ibm.sqls.doc/ids_sqs_1770.htm, last viewed on Jun. 18, 2020, 9 pages.
Kanchan et al., "Survey paper on Generalized Inverted Index for Keyword Search", e-ISSN: 2278-067X, p-ISSN: 2278-800X, www.ijerd.com, vol. 10, Issue 4 (Apr. 2014), pp. 69-73.
Aizawa, Akiko, "An information-theoretic perspective of tf-idf measures", Information Processing and Management 39, dated 2003, 21 pages.
Kononenko et al., "Mining Modern Repositories with Elasticsearch", MSR '14, May 31-Jun. 1, 2014, Hyderabad, India, 4 pages.
Yu et al., "Two birds, one stone: a fast, yet lightweight, indexing scheme for modern database systems", dated Nov. 2016, 5 pages.
Microsoft Docs, "Columnstore indexes—Query performance", dated Jan. 11, 2019, https://docs.microsoft.com/en-us/sql/relational-databases, 11 pages.
Microsoft Docs, "Query with Full-Text Search", dated Mar. 14, 2017, 12 pages.
Modern SQL, "What's New in SQL", dated Jun. 15, 2017, 19 pages.
Niwattanakul et al., "Using of Jaccard Coefficient for Keywords Similarity", International MultiConference of Engineers and Computer Scientists 2013 vol. I, dated Mar. 2013, 6, pages.
Patil et al., "Inverted Indexes for Phrases and Strings", SIGIR' 11, Jul. 2011, ACM, Beijing, China, 10 pages.
The PartiQL Specification Committee, "PartiQL Specification", dated Aug. 1, 2019, 48 pages.
Truica et al., "CRUD Operations in MongoDB", International Conference on Advanced Computer Science and Electronics Information (ICACSEI 2013), dated 2013, 4 pages.
Twitter Blog, "Dremel made simple with Parquet", dated Sep. 11, 2013, https://blog.twitter.com/engineering/en_us/a/2013/dremel-made-simple-with-parquet.html, 12 pages.
Wan et al., "When Optimizer Chooses Table Scans: How to Make Them More Responsive", ACM, dated 2018 Association for Computing Machinery, 10 pages.
Wu et al., "Ginix: Generalized Inverted for Keyword Search", IEEE Transactions on Knowledge and Data Mining vol. 8 No. 1 Year 2013, 11 pages.
Khan et al., "SQL Support Over Mongo DB Using Metadata", International Journal of Scientific and Research Publications, vol. 3, Issue 10, dated Oct. 2013, 5 pages.
Liu, U.S. Appl. No. 16/690,817, filed Nov. 21, 2019, Office Action, dated Feb. 4, 2021.
Liu, U.S. Appl. No. 16/690,817, filed Nov. 21, 2019, Interview Summary, dated Jun. 16, 2021.
Liu, U.S. Appl. No. 16/690,817, filed Nov. 21, 2019, Final Office Action, dated Jun. 16, 2021.
Liu, U.S. Appl. No. 16/690,817, filed Nov. 21, 2019, Advisory Action, dated Jul. 28, 2021.
Chavan, U.S. Appl. No. 16/365,271, filed Mar. 26, 2019, Advisory Action, dated Jul. 28, 2021.
SQL Server, "Optimizing SQL Server Spatial Queries with Bounding Box", https://aboutsqlserver.com/2013/09/03/optimizing-sql-server-spatial-queries-with-bounding-box/, dated Sep. 3, 2013, 14 pages.
Rudnytskiy, "Understanding Spatial Columns in SAP HANA Spatial", https://developers.sap.com/tutorials/hana-spatial-intro4-columns.html, dated Dec. 11, 2016, 14 pages.
Oracle Spatial User's Guide and References, "Spatial Data Types and Metadata", Release 9.2, Part No. A96630-01, https://docs.oracle.com/cd/B10501_01/appdev.920/a96630/sdo_objrelschema.htm, 26 pages.
Oracle Online Documentation Library, "1.8 Spatial Relationships and Filtering", 12c Release 1 (12.1.0.2), https://docs.oracle.com/database/121/SPAT/spatial-relationships-and-filtering.htm, 4 pages.
Oralce Database Concepts, "Data Concurrency and Consistency", Chapter 13, 10g Release (10.1), Part No. B10743-01, dated Dec. 2003, 39 pages.
Murray et al., "Spatial and Graph Developer's Guide", F15831-03, dated Apr. 2020, 164 pages.
Kelly, Wikibon, "Primer on SAP HANA", wikibon.org/wiki/v/Primer_on_SAP_HANA, dated Jul. 12, 2013, 6 pages.
Chapter 7. Performance Tips, https://postgis.net/docs/performance_tips.html, dated Mar. 30, 2020, 7 pages.
Artemiou, "Introducing SQL Server In-Memory OLTP", https://www.red-gate.com/simple-talk/sql/learn-sql-server/introducing-sql-server-in-memory-oltp/, dated Sep. 30, 2015, 10 pages.
Wikipedia, "Bitmap Index", https://en.wikipedia.org/w/index.php?title=Bitmap_index&oldid=921777233, Oct. 2019, 8 pages.
Sap Hana, "Create an SAP HANA Graph Workspace", Tutorials for SAP Developers, https://developers.sap.com/tutoriais/hana-graph-overview-setup.html, dated Dec. 19, 2018, 17 pages.
PostGIS 2.3.10 Manual, "Performance Tips"; Chaper 7, dated Aug. 11, 2018, 5 pages.
Paul M. Aoki: "How to Avoid Buliding DataBlades That Know the Value of Everything and the Cost of Nothing", Computer Science Division, EECS Department, University of California, Berkeley, Year 1999, 12 pages.
Melnik et al., "Dremel: Interactive Analysis of Web-Scale Datasets", Association for Computing Machinery, vol. 54, No. 6, Jun. 2011, 10 pages.
Fujioka et al., "Application of Bitmap Index to Information Retrieval", NTT CyberSpace Laboratories, NTT Corporation, WWW 2008/Poster Paper, Apr. 2008, 2 pages.

\* cited by examiner

|  | C1 | SSD C2 | C3 | C4 |
|---|---|---|---|---|
| R1 | R1C1 | R1C2 | R1C3 | R1C4 |
| R2 | R2C1 | R2C2 | R2C3 | R2C4 |
| R3 | R3C1 | R3C2 | R3C3 | R3C4 |
| R4 | R4C1 | R4C2 | R4C3 | R4C4 |
| R5 | R5C1 | R5C2 | R5C3 | R5C4 |
| R6 | R6C1 | R6C2 | R6C3 | R6C4 |
| R7 | R7C1 | R7C2 | R7C3 | R7C4 |
| R8 | R8C1 | R8C2 | R8C3 | R8C4 |

TABLE 200

FIG. 2A

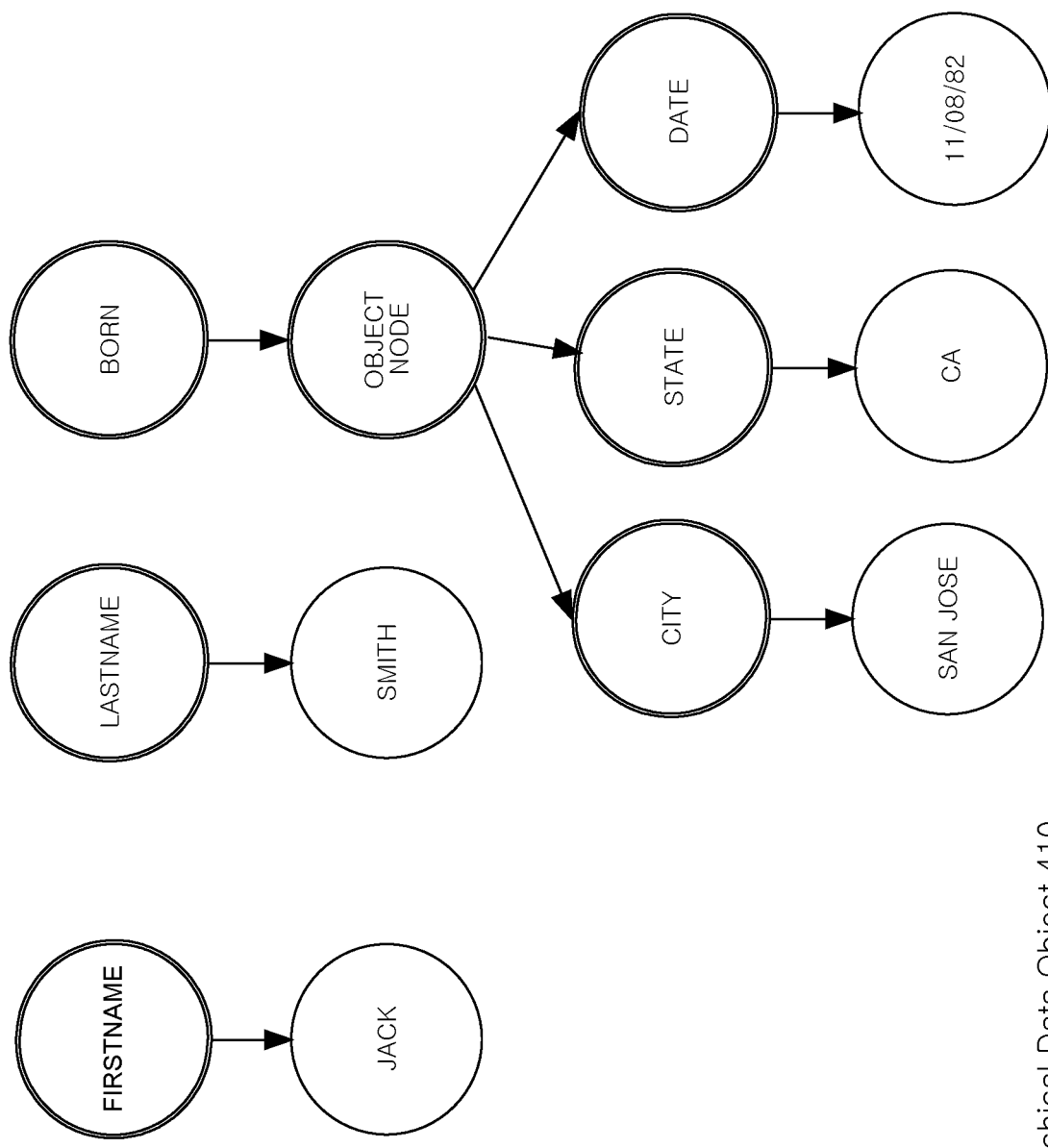

| Index | SSD C2 | |
|---|---|---|
| 0 | {"name": "John Smith", "citizenship": 'USA', "friends": [ {"name": "Helen Yan", "citizenship":'1996-09-10'}, {"name": "Helen Guang Hwang", "citizenship":'1986-06-10'} ] } | R5 |
| 1 | {"name": "Helen Drake", "citizenship": 'USA', } | R6 |
| 2 | {"name": "John Smith", "citizenship": 'UK', } | R7 |
| 3 | {"name": "John Smith", "citizenship": 'USA', } | R8 |

FIG. 5A

JSON Object R5

{ "name":"John Smith",
"citizenship": "USA",
"friends" : [
{"name": "Helen Yan", "citizenship":"USA"},
{"name": "Helen Guang Hwang", "citizenship":"USA"}
]
}

FIG. 5B

Posting Index 601

| Token | Type | PostingList |
|---|---|---|
| name | tagname | (0, (2-4)(10-12)(16, 19)) (1, (2-4)) (2, (2-4)) (3,(2-4)) |
| citizenship | tagname | (0, (5-6)(13-14)(20-21)) (1,(5-6))(2,(5-6))(3,(5-6)) |
| friends | tagname | (0,(7-21)) |
| JOHN | keyword | (0, (3)) (2, (3)) (3, (3)) |
| SMITH | keyword | (0, (4)) (2, (4)) (3, (4)) |
| HELEN | keyword | (0,(11, 17)) (1, (3)) |
| YAN | keyword | (0, (12)) |
| GUANG | keyword | (0,(18)) |
| HWANG | keyword | (0,(19)) |
| DRAKE | keyword | (1, (4)) |
| USA | keyword | (0, (6)(14)(21))(1, (6)) (3, (6)) |
| UK | keyword | (2, (6)) |

FIG. 6A

Hashed Posting Index 651

| HB0 | HB1 | HB2 | HB3 |
|---|---|---|---|

FIG. 6B

Object-Level Posting Index 801

| Token | Type | Tag Location List |
|---|---|---|
| name | tagname | (2-4) |
| citizenship | tagname | (5-6) |
| HELEN | keyword | (3) |
| DRAKE | keyword | (4) |
| USA | keyword | (6) |

FIG. 8

Delta Posting Index 901

| Token | Type | Tag Location List |
|---|---|---|
| name | tagname | (1, (2-4))(2, (2-4)) |
| citizenship | tagname | (1, (5-6))(2, (5-6)) |
| JACK | keyword | (2, (3)) |
| SMITH | keyword | (2, (4)) |
| HELEN | keyword | (1, (3)) |
| DRAKE | keyword | (1, (4)) |
| USA | keyword | (2, (6)) |
| UK | keyword | (1, (6)) |

FIG. 9B

TECHNIQUES FOR ENABLING AND INTEGRATING IN-MEMORY SEMI-STRUCTURED DATA AND TEXT DOCUMENT SEARCHES WITH IN-MEMORY COLUMNAR QUERY PROCESSING

FIELD OF THE INVENTION

The present invention relates to database systems and, more specifically, in-memory caching of semi-structured data stored in columns of a database system.

BACKGROUND

One way to dramatically improve computation of queries in an object-relational database system is to pre-load and retain a database table in a derived cache. In a derived cache, an in-memory version of at least a portion of a database table that is stored in a persistent form may be mirrored in lower latency random access memory (RAM) of a database server in column-major format. In column-major format, a representation of a portion of the column values of a column are stored in a column vector, which occupies a contiguous address range in RAM.

Query operations involving a column, such as predicate evaluation and aggregation on the column, may be performed faster on an in-memory column vector of the column for several reasons. First, the column vector is maintained in lower latency memory where it may be accessed more quickly. Second, runs of column values upon which query operations operate are stored contiguously in memory in a column vector. In addition, column vectors are compressed to reduce memory needed to store a column. Dictionary compression is often used to compress column vectors.

Dictionary compression may also be exploited by compressed-columnar algorithms that are optimized for performing query operations on compressed column vectors to further increase the speed with which such query operations are performed on a column. Other forms of compression may also be exploited by compressed-columnar algorithms.

An example of a derived cache is described in, for example, U.S. application Ser. No. 14/337,179, Mirroring, In Memory, Data From Disk To Improve Query Performance, filed on Jul. 21, 2014 by Jesse Kamp, et al. and issued on Mar. 22, 2016 as U.S. Pat. No. 9,292,564, (the "Mirroring Application"), the entire contents of which are incorporated herein by reference.

The benefits of compressed-columnar algorithms are achieved for columns that contain scalar values, such as integers and strings. However, columns that contain semi-structured data, such as XML (eXtended Mark-up Language) and JSON (JavaScript Object Notation), may not be stored in column-major form in a way that can be exploited by compressed-columnar algorithms.

Semi-structured data is typically stored in persistent form in a large binary object (LOB) column. Within a LOB column, semi-structured data may be stored in various semi-structured data formats, including as a body of marked-up text, or in proprietary formats that are structured for compressibility and quick access. Unfortunately, compressed-columnar algorithms that work powerfully for scalar columns are not effective with these semi-structured data formats.

In addition, there are query operations that are specific to semi-structured data, such as path based query operations. Path based operations are not amenable to being optimized for semi-structured data that is stored in a column vector.

Database management systems (DBMSs) that support semi-structured data usually also store database data in scalar columns. Queries processed by such a DBMS may reference both semi-structured and scalar database data. Such queries are referred to herein as mixed-format queries. Even though mixed-format queries require access to semi-structured data, mixed-format queries nevertheless benefit from a derived columnar cache because at least part of the work of executing queries may use a derived columnar cache for scalar columns. For a part of the work that requires accessing semi-structured data, these DBMSs use traditional query operations that operate on persistent form data (PF data).

It is becoming increasingly important to be able to store and efficiently access semi-structured data. Described herein are techniques for maintaining semi-structured data in a derived cache for improved speed for executing queries, including mixed-format queries.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 2A is a diagram of a table used for examples, according to an embodiment.

FIG. 4B is a node tree representing a JSON object, according to an embodiment.

FIG. 5A is a diagram depicting JSON objects stored in persistent form in a column, according to an embodiment.

FIG. 5B is a diagram illustrating token and token locations according to an embodiment.

FIG. 6A is a posting index mapping tokens to token locations in hierarchical data objects, according to an embodiment.

FIG. 6B depicts the posting index in serialized hash table form, according to an embodiment.

FIG. 8 depicts an object-level posting list, according to an embodiment.

FIG. 9B depicts a delta posting index, according to an embodiment.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for maintaining semi-structured data on persistent storage in a persistent form, and in a derived cache in another form referred to as in semi-structured data in-memory form (SSDM form). Semi-structured data stored in the persistent-format is referred to herein as PF semi-structured data. Semi-structured data stored in SSDM form is referred to herein as SSDM data.

According to an embodiment, a "hybrid derived cache" stores semi-structured data in SSDM form and columns in another form, such as column-major format. The data stored in the derived cache is referred to herein has mirrored form data (MF data). The hybrid derived cache may cache scalar type columns in column-major format, and semi-structured data in a column in an SSDM form. The structure of the SSDM form enables and/or enhances access to perform path-based and/or text based query operations.

A hybrid derived cache improves cache containment for executing query operations. Cache containment refers to limiting accesses to database data needed for executing a query operation to accesses within the hybrid derived cache. In general, the higher the degree of cache containment for executing a query, the greater the benefit of the hybrid derived cache, which leads to faster execution of the query, including mixed-format queries.

Mixed-format queries may also include queries that access unstructured-text data. Unstructured-text data may be stored in, for example, LOBs. Techniques described herein may be used to store unstructured-text data on persistent storage in a persistent format, and in a derived cache in an in-memory form that in various respects may be less complex than SSDM form.

General Architecture

According to an embodiment, a derived cache is implemented within a DBMS using an in-memory database architecture that keeps the PF data and the MF data transactionally consistent. Such an in-memory database architecture is described in detail in the Mirroring Application. The Mirroring Application describes, among other things, maintaining multiple copies of the same data items, where one copy is maintained in a persistent form, and another copy is maintained in volatile memory in mirrored form.

Figure 1:
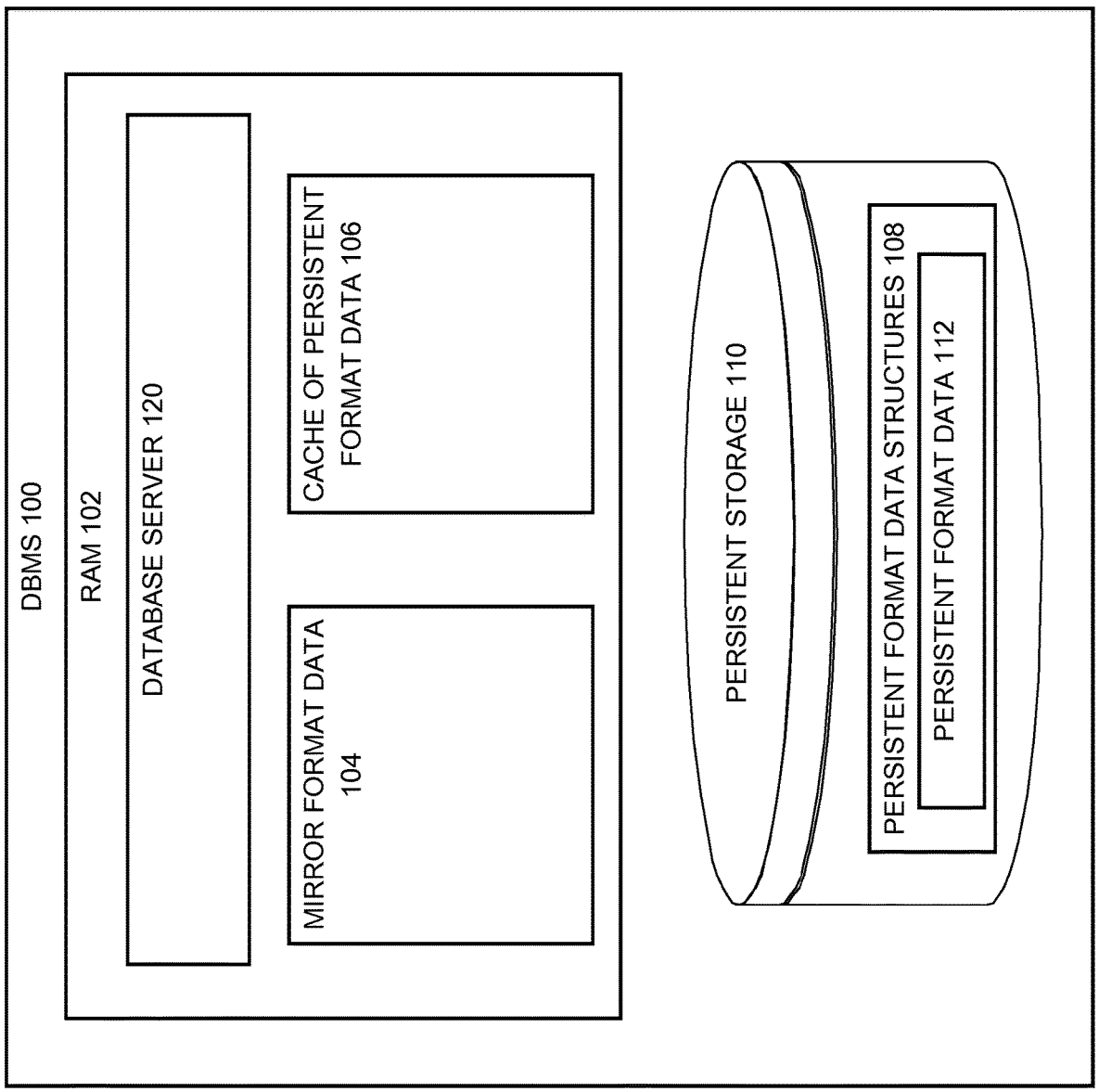
FIG. 1 is a diagram of a database system that concurrently maintains mirror format data in volatile memory and persistent format data on persistent storage, according to an embodiment.

FIG. 1 is a block diagram of a database system according to an embodiment. Referring to FIG. 1, DBMS 100 includes RAM 102 and persistent storage 110. RAM 102 generally represents RAM used by the DBMS and may be implemented by any number of memory devices, including volatile and non-volatile memory devices, and combinations thereof.

Persistent storage 110 generally represents any number of persistent block-mode storage devices, such as magnetic disks, FLASH memory, solid state drives, or non-volatile RAM that accessible through a block-mode interface to read or write data blocks stored thereon.

Within DBMS 100, a database server 120 executes a database statement that is submitted to the database server by one or more database applications (not shown). The data used by those applications is illustrated as PF data 112. PF data 112 resides in persistent storage 110 in PF data structures 108. The PF data structures 108 may be, for example, row-major data blocks. While row-major data blocks are used for the purposes of illustration, the PF structures may take any form, such as a column-major data block, hybrid compression units, etc.

The RAM 102 further includes a buffer cache 106 of PF data. Within buffer cache 106, the data is stored in a format that is based on the format in which the data resides within the PF data structures 108. For example, if the persistent format is row-major data blocks, then buffer cache 106 may contain cached copies of row-major data blocks.

On the other hand, MF data 104 is in a format that is different than the persistent format. In an embodiment where the persistent format is row-major data blocks, the mirror format may be column-major for scalar columns and SSDM form for columns holding semi-structured data. Because the mirror format differs from the persistent format, MF data 104 is produced by performing transformations on the PF data. These transformations occur both when RAM 102 is initially populated with MF data 104 (whether at start-up or on-demand), and when RAM 102 is re-populated with MF data 104 after a failure.

Significantly, the existence of MF data 104 may be transparent to the database applications that submit database commands to the database server. Applications that had made use of a DBMS that operated exclusively on PF data may interact without modification with a database server that maintains MF data 104 in addition to PF data 112. Further, transparent to those applications, that database server may use MF data 104 to more efficiently process some or all of those database commands.

The Mirror Format Data

MF data 104 may mirror all of PF data 112, or a subset thereof. In one embodiment, a user may specify what portion of PF data 112 is "in-memory enabled". The specification may be made at any level of granularity, including columns and row ranges.

As shall be described hereafter, in-memory enabled data is converted to the mirror format and stored as MF data 104 in RAM 102. Thus, when in-memory enabled data is required by a database statement, the database server has the option of providing the data from either PF data 112 or MF data 104. The conversion and loading may occur at the time the database is started, or in a lazy or on-demand fashion. Data that is not in-memory enabled is not mirrored in MF data 104. Consequently, when such data is required by a query, the database server does not have the option of obtaining the data from MF data 104.

For the purpose of explanation, it shall be assumed that PF data structures 108 include the table 200 illustrated in FIG. 2A. Table 200 includes four columns C1, SSD C2, C3, and C4, and eight rows R1, R2, R3, R4, R5, R6, R7, and R8. SSD C2 stores semi-structured data.

A row in persistent storage may be uniquely identified by a row-id. In table 200, the first row is associated with row-id R1, and the last row is associated with row-id R8. A column of a row may be referred to herein by a concatenation of row-id and column. For example, column C1 of row R1 is identified by R1C1, and C3 of R5 is identified by R5C3.

Figure 2B:
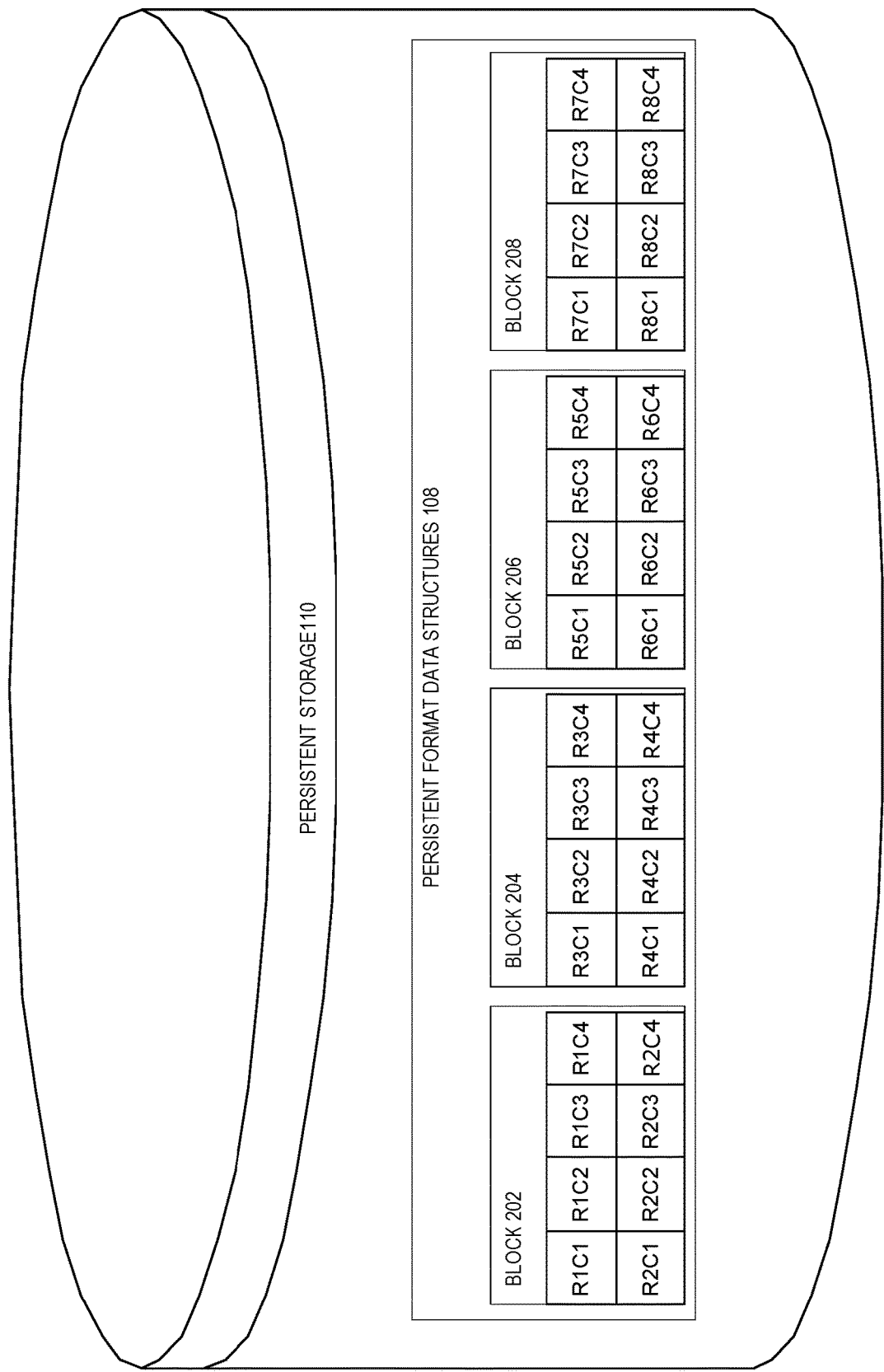
FIG. 2B is a diagram of a persistent form of storing data for the table, according to an embodiment.

FIG. 2B illustrates how the data that resides in table 200 may be physically organized on persistent storage 110. In the present example, the data for table 200 is stored in four row-major data blocks 202, 204, 206, and 208. Block 202 stores the values for all columns of row R1, followed by the values for all columns of row R2. Block 204 stores the values for all columns of row R3, followed by the values of all columns of row R4. Block 206 stores the values of all columns of row R5, followed by the values of all columns of row R6. Finally, block 208 stores the values of all columns of row R7, followed by the values of all columns of row R8.

According to an embodiment, column SSD C2 may be a LOB column defined by DBMS 100 as storing semi-structured data. For a particular row, a LOB in SSD C2 may be inline or out-of-line. For an inline LOB for a row, the LOB's data is physically stored in the same data block of the row. For an out-of-line LOB, a reference is stored in the row in the data block; the reference refers to a location within another set of data blocks that stores data for the LOBs. In effect, the out-of-line LOB is logically but not physically stored in the data block that contains a LOB out-of-line. For purposes of exposition, a LOB in a column of a row in a data block may be referred to herein as stored or contained within the data block regardless of whether the LOB is inline or out-of-line.

Copies of data blocks may be temporarily stored in buffer cache 106. Buffer cache 106 may be managed using any one of a variety of cache management techniques.

Hybrid Derived Cache & IMCUs

According to an embodiment, MF data 104 is cached and maintained within a hybrid derived cache. Within a hybrid derived cache, MF data 104 is stored in units referred to herein as an in-memory compression unit (IMCU). Each IMCU stores a different set of MF data.

Figure 3:
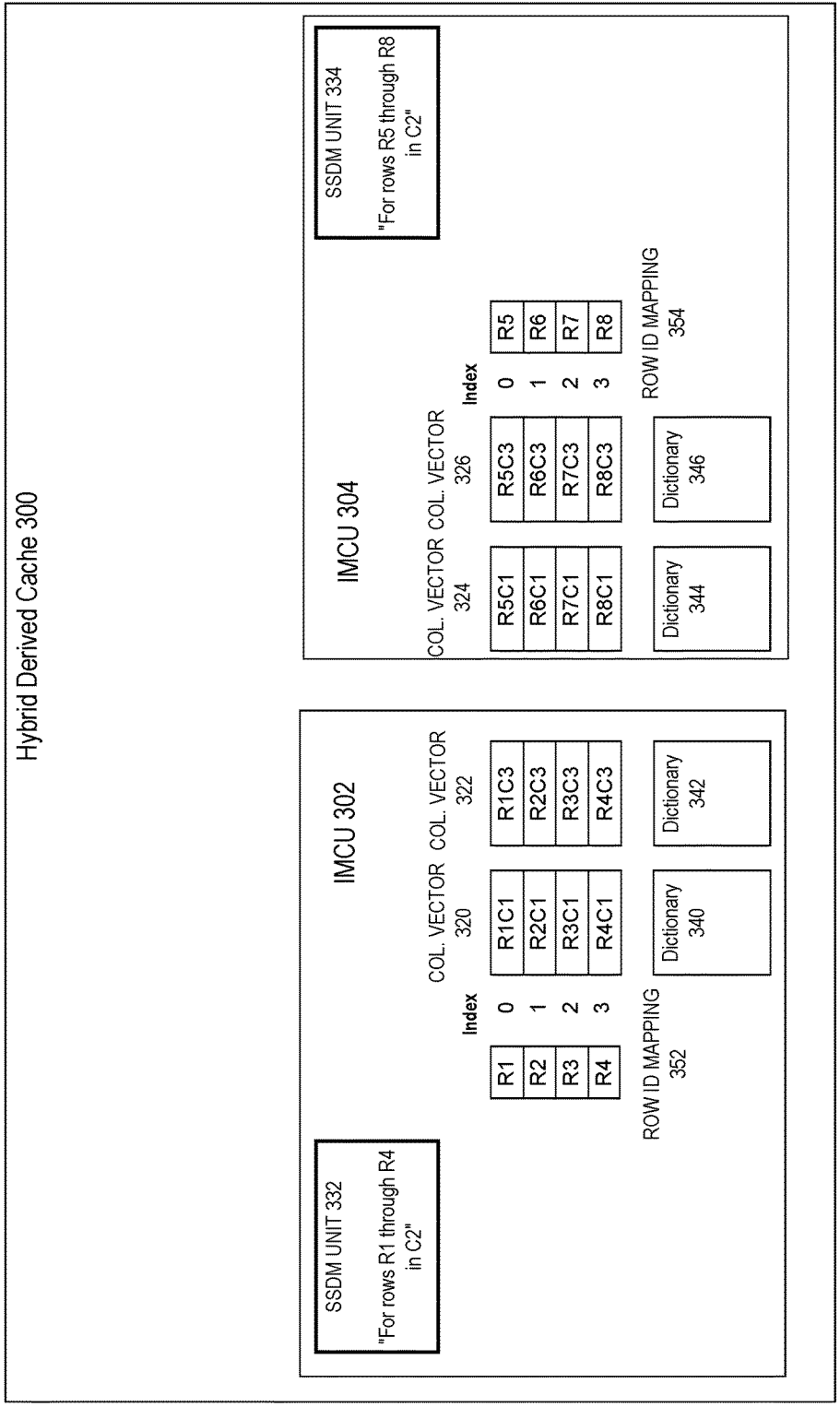
FIG. 3 is a diagram showing a hybrid derived cache, according to an embodiment.

FIG. 3 depicts a hybrid derived cache 300, a hybrid derived cache according to an embodiment of the present invention. As illustrated in FIG. 3, hybrid derived cache 300 comprises IMCU 302 and IMCU 304.

IMCUs are organized in a manner that corresponds to the organization of the PF data. For example, on persistent storage 110, the PF data may be stored in a series of contiguous (within an address space) data blocks. Under these circumstances, within hybrid derived cache 300, MF data 104 stores data from the series of data blocks. IMCU 302 holds MF data from rows R1-R4, and IMCU 304 holds MF data from rows R5-R8.

IMCU 302 holds column values for C1 for rows R1-R4 in column vector 320 and column values for C3 for rows R1-R4 in column vector 322. SSDM unit 332 holds semi-structured data in SSDM form for rows R1-R4. IMCU 304 holds column values for C1 for rows R5-R8 in column vector 324 and column values for C3 for rows R5-R8 in column vector 326. SSDM unit 334 holds semi-structured data in a SSDM form for rows R5-R8.

The column vectors depicted in hybrid derived cache 300 are dictionary compressed. In dictionary based compression of a column, a value is represented by a dictionary code, which is typically much smaller than the value the dictionary code represents. A dictionary maps dictionary codes to values. In a column vector of a column, occurrences of a value in a column are represented by a dictionary code within the column vector that is mapped by the dictionary to the value.

According to an embodiment, each IMCU encodes a column vector according to a dictionary for that column vector. Column vector 320 and column vector 322 are encoded according to dictionary 340 and 342, respectively, and column vector 324 and column vector 326 are encoded according to dictionary 344 and 346, respectively.

Each dictionary code in the column vector is stored within a respective element of a column vector, the respective element corresponding to an ordinal position or index. For example, in column vector 324, the index 0, 1, 2, and 3 correspond to the first, second, third, and fourth element respectively.

When the term "row" is used herein in reference to one or more column vectors, the "row" refers to the set of one or more elements across the set of column vector elements that have the same index in each of the column vectors and that correspond to the same row. The row id of the row and the index corresponding to the set of elements may be used to identify the set of elements. For example, row R5 and row 0 refer to the first element in each of column vector 324 and 326.

A row id mapping 352 in IMCU 302 and row id mapping 354 in IMCU 304 map rows in column vectors to row ids. According to an embodiment, a row id mapping is a column vector that contains row ids. A row in a column vector is mapped to the row id at the same index position of the row in the row id mapping. Element 0 in column vector 324 and column vector 326 are mapped to row R5, which is the value of the element 0 in row id mapping 354.

Predicate Evaluation and Row ID Resolution

A conventional database system may operate normally by responding to a query by first searching for the requested data in buffer cache 106. If the data is in buffer cache 106, the data is accessed from buffer cache 106. Otherwise, the needed data is loaded from PF data structures 108 into buffer cache 106, and then accessed from buffer cache 106. However, because the data in both buffer cache 106 and PF data structures 108 is in the persistent format, performing operations based exclusively on the PF data does not always provide the best performance. Performing an operation in this way against PF data is referred to herein as PF-side processing.

According to an embodiment, the database server uses the hybrid derived cache 300 to perform at least some of the database operations needed to execute a database query. Such operations include predicate evaluation, projection, and aggregation. The greater the portion of database accesses needed for execution of the query that can be satisfied using the hybrid derived cache, the greater the cache containment.

According to an embodiment, predicate evaluation against multiple columns can be performed at least in-part by accessing MF data in IMCUs. For each column cached in an IMCU, the results of a predicate evaluation are recorded in an index-aligned result vector. In an indexed aligned result vector, each bit in a bit vector corresponds to an index of a column vector, with bit 0 corresponding to the $0^{th}$ index, bit 1 corresponding to the $1^{st}$ index, and so forth. The term "result vector" is hereafter used to refer to an indexed aligned bit vector. For a conjunctive predicate, multiple result vectors may be generated, each representing the result of a predicate conjunct, and then combined to generate a "return result vector" representing the result of the conjunctive predicate evaluation against columns cached in the IMCU.

The return result vector may be used to perform row resolution. Row resolution uses the return result vector and the row id mapping to generate a return row list that includes the row ids of the rows identified by the return result vector and which satisfy the evaluation represented by the return result vector. The return row list may be used to perform further PF-side predication evaluation of rows in the return row list on any column not cached in the hybrid derived cache 300, or to perform other operations such as projection of the columns not cached, or evaluation of other predicate conditions of the predicate or other predicates in a query.

For example, a query with the predicate C1="SAN JOSE" AND C3="CA" AND C4>"1400.00" is evaluated by DBMS 100. DBMS 100 evaluates the predicate against C1 and C3 in IMCU 304. A bit vector "1110" is generated for column vector 324 (C1) and a bit vector of "0110" is generated for column vector 326 (C3). Performing an AND operation generates a return vector of "0110". Based on row id mapping 344, rows R6 and R7 are mapped to the set bits in the return vector. DBMS 100 generates a row return list that includes rows R6 and R7. Based on the row return list, DBMS 100 evaluates the rows R6 and R7 against the predicate condition C4>"1400.00" using PF-side predicate evaluation.

Examples of Semi-Structured Data

A SSDM unit within an IMCU is structured to facilitate predicate evaluation on semi-structured data. Before describing an SSDM unit, it useful to describe in greater detail semi-structured data. Semi-structured data generally refers herein to a collection of hierarchical data objects, where the hierarchical structure is not necessarily uniform across all objects in the collection. Frequently, hierarchical data objects are data objects that are marked by a hierarchical mark-up language. XML and JSON are examples of a hierarchical mark-up language.

Data structured using a hierarchical mark-up language is composed of nodes. Nodes are delimited by a set of delimiters that mark the nodes and may be tagged with names, referred to herein as tag names. In general, the syntax of hierarchical mark-up languages specifies that tag names are embedded, juxtaposed, or otherwise syntactically associated with delimiters that delimit nodes.

For XML data, a node is delimited by start and end tags that comprise tag names. For example, in the following XML fragment X,

```
<ZIPCODE>
    <CODE>95125</CODE>
    <CITY>SAN JOSE</CITY>
    <STATE>CA</STATE>
</ZIPCODE>
``` the start tag <ZIP CODE> and the end tag </ZIP CODE> delimit a node having the name ZIP CODE.

Figure 4A:
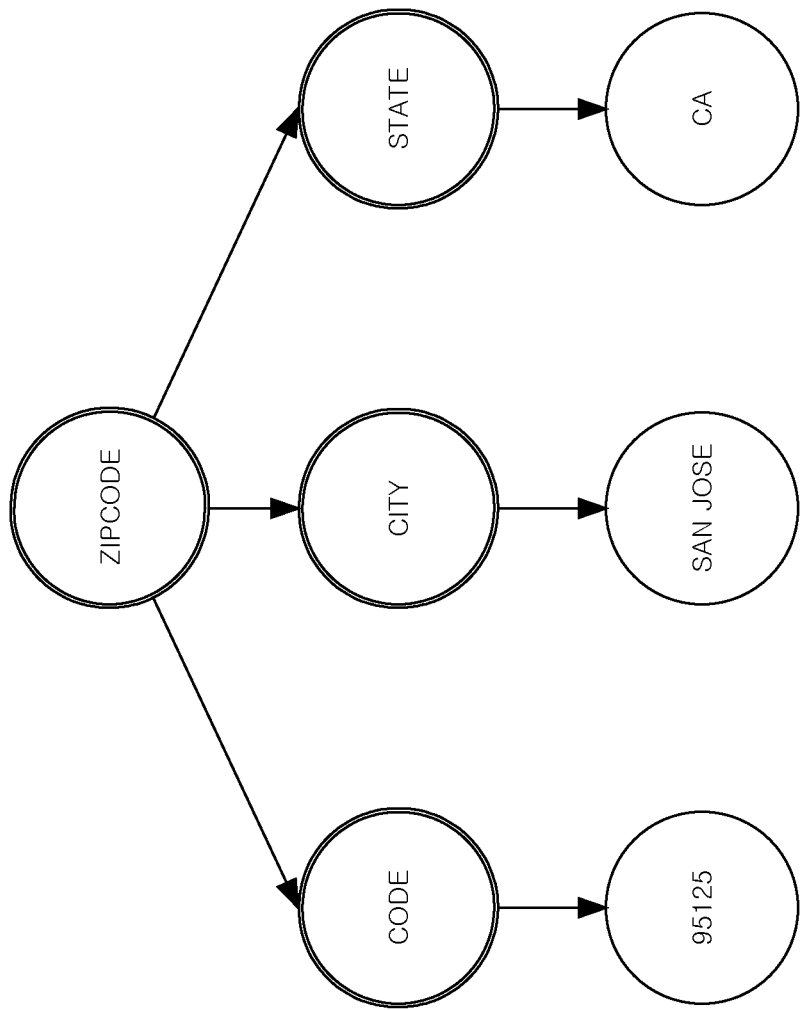
FIG. 4A is a node tree representing a XML fragment, according to an embodiment.

FIG. 4A is a node tree representing the above XML fragment X. Referring to FIG. 4A, it depicts hierarchical data object 401. Non-leaf nodes are depicted with double-line borders, while leaf nodes are depicted with single-line borders. In XML, a non-leaf node corresponds to an element node, and a leaf node corresponds to a data node. The element nodes in the node tree are referred to herein by the node's name, which is the name of the element represented by a node. For convenience of exposition, the data nodes are referred to by the value the data nodes represent.

The data between the corresponding tags is referred to as a node's content. For a data node, the content can be a scalar value (e.g., integer, text string, date).

A non-leaf node, such as an element node, contains one or more other nodes. For an element node, the content can be a data node and/or one or more element nodes.

ZIPCODE is an element node that contains child nodes CODE, CITY, and STATE, which are also element nodes. Data nodes 95125, SAN JOSE, and CA are data nodes for element nodes CODE, CITY, and STATE, respectively.

The nodes contained by a particular node are referred to herein as descendant nodes of the particular node. CODE, CITY, and STATE are descendant nodes of ZIPCODE. 95125 is a descendant node of CODE and ZIPCODE, SAN JOSE is a descendant node of CITY and ZIPCODE, and CA is a descendant node of STATE and ZIPCODE.

A non-leaf node thus forms a hierarchy of nodes with multiple levels, the non-leaf node being at the top level. A node at each level is linked to one or more nodes at a different level. Any given node at a level below the top level is a child node of a parent node at the level immediately above the given node. Nodes that have the same parent are sibling nodes. A parent node may have multiple child nodes. A node that has no parent node linked to it is a root node. A node that has no child nodes is a leaf node. A node that has one or more descendant nodes is a non-leaf node.

For example, in container node ZIP CODE, node ZIP CODE is a root node at the top level. Nodes 95125, SAN JOSE, and CA are leaf nodes.

The term hierarchical data object is used herein to refer to a sequence of one or more non-leaf nodes, each non-leaf node having a child node. An XML document is an example of a hierarchical data object. Another example is a JSON object.

JSON

JSON is a lightweight hierarchical mark-up language. A JSON object comprises a collection of fields, each of which is a field name/value pair. A field name is in effect a tag name for a node in a JSON object. The name of the field is separated by a colon from the field's value. A JSON value may be:

An object, which is a list of fields enclosed in braces "{ }" and separated within the braces by commas.

An array, which is a list of comma separated JSON nodes and/or values enclosed in square brackets "[ ]".

An atom, which is a string, number, true, false, or null.

The following JSON hierarchical data object J is used to illustrate JSON.

```
{
    "FIRSTNAME": "JACK",
    "LASTNAME": "SMITH",
    "BORN": {
        "CITY": "SAN JOSE",
        "STATE": "CA",
        "DATE": "11/08/82"
    },
}
```

Hierarchical data object J contains fields FIRSTNAME, LASTNAME, BORN, CITY, STATE, and DATE. FIRSTNAME and LASTNAME have atom string values "JACK" and "SMITH", respectively. BORN is a JSON object containing member fields CITY, STATE, and DATE, which have atom string values "SAN JOSE", "CA", and "11/08/82", respectively.

Each field in a JSON object is a non-leaf node and the name of the non-leaf node is the field name. Each non-empty array and non-empty object is a non-leaf node, each empty array and empty object is a leaf node. Data nodes correspond to an atom value.

FIG. 4B depicts hierarchical data object J as hierarchical data object 410 comprising nodes as described below. Referring to FIG. 4B, there are three root nodes, which are FIRSTNAME, LASTNAME, and BORN. Each of FIRSTNAME, LASTNAME, and BORN is a field node. BORN has a descendant object node labeled OBJECT NODE.

OBJECT NODE is referred to herein as a containment node because it represents a value that may contain one or more other values. In the case of OBJECT NODE, it represents a JSON object. From the OBJECT NODE three descendant field nodes descend, which are CITY, STATE, and DATE. Another example of a containment node is an object node representing a JSON array.

Nodes FIRSTNAME, LASTNAME, CITY, and STATE have child data nodes representing atom string values "JACK", "SMITH", "SAN JOSE", and "CA", respectively. Node DATE has a descendant data node that represents the date type value "11/08/82".

Paths

A path expression is an expression comprising a sequence of "path steps" that identifies one or more nodes in a hierarchical data object based on each hierarchical position of the one or more nodes. The "path steps" may be delimited by a "/", ".", or another delimiter. Each path step may be a tag name identifying a node in a path to a node within the hierarchical data object. XPath is a query language specifying a path language for path expressions. Another query language is SQL/JSON, part of the SQL/JSON standard that was developed by Oracle and IBM in conjunction with other RDBMS vendors.

In SQL/JSON, an example of a path expression for JSON is "$.BORN.DATE". The step "DATE" specifies a node having the node name "DATE". The step "BORN" specifies the node name of the parent node of node "DATE". The "$" specifies the context of the path expression, which by default is the hierarchical data object for which the path expression is being evaluated.

A path expression may also specify predicates or criteria for a step that a node should satisfy. For example, the following query $.born.date>TO_DATE('1998-09-09', 'YYYY-MM-DD')

specifies that node "born.date" is greater than the date value '1998-09-09'.

Illustrative SSD Column & Posting List

According to an embodiment, a SSDM unit comprises a posting index that indexes tokens to token locations found in hierarchical data objects. A posting index is illustrated using hierarchical data objects depicted in FIG. 5A. An illustrative posting index is depicted in FIG. 6A and FIG. 6B depicts a hashed posting index, which is a posting index in serialized hash table form, which is used in an embodiment.

Referring to FIG. 5A, it depicts hierarchical data objects in a PF form. Referring to FIG. 5A, for each row of R5, R6, R7, and R8, a JSON object is stored. A JSON object, in persistent form or mirror format, is referred to herein by the row id of the row that contains the JSON object. Row R5 contains JSON object R5, which is used to illustrate tokens.

A posting index comprises tokens extracted from hierarchical data objects. A token may be a tag name of a non-leaf node, a word in a data node, or another value in a data node, a delimiter, or another feature of a hierarchical data object. Forming a posting index entails parsing and/or extracting tokens from hierarchical data objects. Not all tokens found in an hierarchical data object are necessarily indexed by a posting index.

In general, a posting index indexes tokens that are tag names or words in string value data nodes. The posting index indexes each token to one or more hierarchical data objects that contain the token, and to the sequence of characters in those hierarchical data objects that cover the content of the token.

For JSON, a token may be:
1) The beginning of an object or array.
2) A field name.
3) An atom value, in the case of a non-string JSON value.
4) A word in a string atom value.

A posting index may index a collection of hierarchical data objects that conform to a hierarchical mark-up language, such as JSON, XML, or a combination thereof. A posting index is illustrated using hierarchical data objects that conform to JSON; however, an embodiment of a posting index is not limited to JSON.

Within a hierarchical data object, tokens are ordered. The order of a token is represented by an ordinal number that is referred to herein as a token number.

Tokens that correspond to a field name or a word in a string atom value are used to form key values for a posting index. Each index entry in a posting index maps a token to a token location, which may be a token number or a token range defined by, for example, a beginning token number and end token number.

A token that corresponds to a tag name of a non-leaf node is referred to herein as a tag name token. With respect to JSON, a tag name is a field name, and a token that corresponds to a field name is a tag name token but may also be referred to herein as a field token.

A token range specifies, in terms of token numbers of a token, the region in a JSON object corresponding to the field node and the content of the field node.

FIG. 5B depicts the tokens in JSON object R5. Each call out label in FIG. 5B refers to a token in JSON object 505 by token number. Token #1 is the beginning of the JSON object. Token #2 is a field name "name". Token #3 is the first word in the atom string value of field "name". Token #4 is the second word in the atom string value of field "name". Token #7 corresponds to a field token "friends". Token #8 is a delimiter that corresponds to the beginning of the array that is the JSON value for field "friends". Token #9 and token #15 are each a delimiter that corresponds to the beginning of an object within the array.

A token that is a word in a string value of a data node is referred to herein as word token. Token #3 is a word token. A token that corresponds to a non-string value of a data node is referred to herein as a value token. Value tokens are not illustrated herein.

Illustrative Posting Index and Hashed Posting Index

FIG. 6A depicts posting index 601. Posting index 601 is a table that indexes tokens to token locations within JSON objects R5, R6, R7, and R8. According to an embodiment, posting index 601 comprises column Token, Type and column PostingList. Column Token contains tokens corresponding to field tokens and word tokens found in JSON objects. Column Type contains token type, which may be "tagname" to designate tokens that are field tokens and may be "keyword" to designate tokens that are word tokens.

Column PostingList contains posting lists. A posting list comprises one or more object-token-location lists. An object-token-location list includes an object reference to a hierarchical data object, such as a JSON object, and one or token locations for occurrences of the token within the hierarchical data object. Each posting index entry in Posting index 601 maps a token to a posting list, thereby mapping the token to each JSON object that contains the token and to one or more token locations in each JSON object.

The depiction of posting index 601 in FIG. 6A shows the entries generated for JSON objects in SSD column C2. Referring to FIG. 6A, Posting index 601 contains an entry for "name". Because the entry contains "tagname" in column Type, the entry maps the token "name" as a field token to JSON objects and token locations specified in posting list (0, (2-4)(10-12)(16-19)) (1, (2-4)) (2, (2-4)) (3,(2-4)). The posting index entry for token "name" contains the following object-token-location lists in the:

(0, (2-4), (10-12), (16-19)) This object-token-location list includes an object reference 0, which refers to the index of a row that contains JSON object R5. The object-token-location list maps the field token "name" to regions in JSON object R5 defined by token ranges #2-#4, token range #10-#12, and token range #16-#19.

The object reference in the object-token-location list is referred to as being index aligned because, for a row that contains a hierarchical data object, the object reference is the index of the row across the column vectors in an IMCU. Similarly, posting index 601 and the posting index entries therein are referred to herein as being index aligned because the posting index entries map tokens to hierarchical data objects based on indexed aligned object references.

(1,(2-4)) This object-token-location list refers to JSON object R6 at index 1 of column vector 324 and 326. The object list maps a field node "name" to the region in JSON object R6 defined by token range #2-#4.

Posting index 601 also contains an entry for "Helen". Because the entry contains "keyword" in Type, the entry maps the token "Helen" as a word in a data node to the JSON objects and regions specified in posting list (0,(11, 17)) (1, (3)). This posting list contains object-level lists as follows:

(0,(11, 17)) This object-token-location list refers to JSON object R5 at index 0. The object-level list further maps the word "Helen" to two token locations in JSON object 505 defined by token location #11 and #17.

(1, (3)) This object-token-location list refers to JSON object 506 of row R6 at index 0. The object reference maps the word "Helen" to a token location #3 in JSON object 506.

Hashed Posting Index

For more efficient storage, a posting index is stored as a serialized hash table within an SSDM unit. Each hash bucket of the hash tables stores one or more entries of the posting index entries.

Figure 6C:
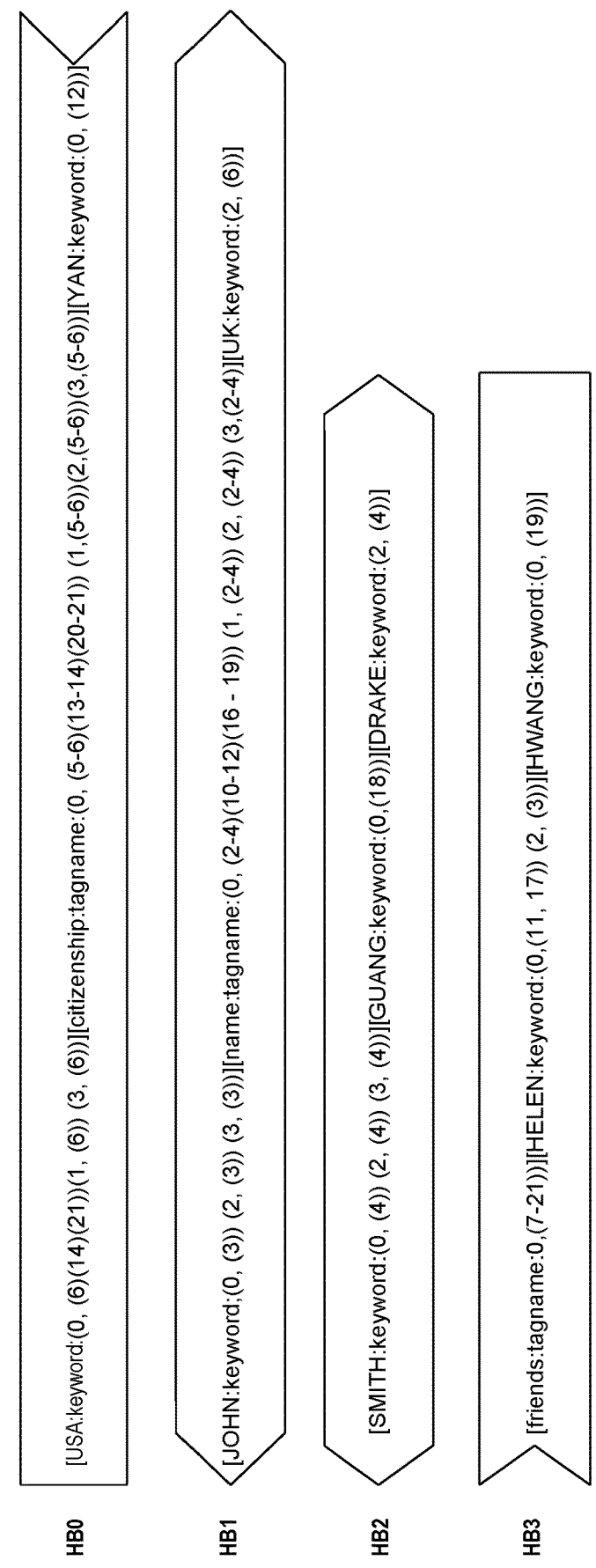
FIG. 6C depicts an expanded view of the posting index in serialized hash table form, according to an embodiment.

FIG. 6B shows a posting index 601 in serialized hash table form as Hashed posting index 651. Referring to FIG. 6B, Hashed posting index 651 includes four hash buckets HB0, HB1, HB2, and HB3. FIG. 6C is an expanded view of Hashed posting index 651 that shows content of each hash bucket HB0, HB1, HB2, and HB3. Each hash bucket can hold one or more posting listing index entries.

The particular hash bucket in which a posting index entry is held is determined by applying a hash function to the token of the posting list index entry. The hash function evaluates to 0 for tokens "USA", "citizenship", "YAN"; accordingly, the posting list of each of the tokens "USA", "citizenship", "YAN" is stored in HB0.

A serialized hash bucket is stored as a stream of bytes within a memory. In an embodiment, each hash bucket, and components within the hash bucket, such as posting lists and object-token-location lists, may be delimited by a delimiter and may include a header. For example, hash bucket HB0 may include a header with an offset pointing to the next hash bucket HB1. Each object-level list in HB0 may include an offset to the following object list, if any. In another embodiment, an auxiliary array may contain an offset to each hash bucket in a serialized hash bucket. A serialized hash bucket may have less of a memory foot print than non-serialized forms of the hash bucket.

Predicate Evaluation Using Posting Index

The index alignment of object references in the object lists enables and/or facilitates generating a bit vector for a predicate condition on SSD C2 that is combinable with other bit vectors generated for predicate evaluation on column vectors to generate a return vector. For example, a query with the conjunctive predicate "C1="SAN JOSE" AND C3="CA" AND C2 CONTAINS "UK" is being evaluated by DBMS 100. DBMS 100 evaluates the predicate against C1 and C3 in IMCU 304. A bit vector "1110" is generated for the predicate conjunct C1="SAN JOSE" on column vector 324 (C1) and a bit vector of "0110" for the predicate conjunct C3="CA" on column vector 326 (C3).

For the predicate condition, C2 CONTAINS "UK" on column C2, the hash table is accessed to determine which rows hold a JSON object containing "UK". Applying the value "UK" to the hash function yields 1. Hash bucket HB1 is evaluated to determine which JSON objects contain "UK". The only object list mapped to "UK" includes an object reference of index 2. Based on the object reference 2, the corresponding third bit in a result vector is set thereby generating the bit vector 0010.

An AND operation is performed between the bit vectors generated for the predicate. The AND operation generates return result vector 0010.

Predicate Evaluation Requiring Functional Evaluation

When performing an evaluation on a hierarchical data object, it is important to be able to specify structural features of the data to return. Structural features are based on the location of data within a hierarchical data object. Evaluation based on such features is referred to herein as a functional evaluation. Examples of structural features include element containment, field containment, string nearness, and path-based location in hierarchical data objects. Token locations within a posting list index may be used to evaluate, at least partially, structural features.

For example, predicate condition $.CITIZENSHIP="USA" specifies that the field "citizenship" within a JSON object "citizenship" equals the string value "USA". To determine whether the predicate is satisfied, hashed posting index 651 may be examined to find hierarchical data objects having the tag name "citizenship", and for each that do, to determine whether a token that is within the range of the token location of the tag name "citizenship" is a keyword equal to "USA".

Specifically, the hash function for hashed posting index 651 is applied to "citizenship" generating the hash value 0. Hash bucket HB0 is examined to determine that tag name "citizenship" is contained in hierarchical data objects referenced by indexes 0, 1, 2, 3, which are JSON object R5, R6, R7, and R8. For JSON object R6, the JSON object referred to by index 1, the token location for the tag name is (5-6).

Next, the posting list for "USA" is examined. The hash function is applied to "USA" generating a hash value of 0. Hash bucket HB0 is examined to determine that key word "USA" is a key word token at token location 6, which it is. Thus, hierarchical data object at index 1 in row R6 satisfies the predicate.

The evaluation of other token locations for tag name "citizenship" is performed similarly. Examples of token location based predicate evaluation of structural features, including path evaluation, is described in U.S. Pat. No. 9,659,045, entitled Generic Indexing For Efficiently Supporting Ad-Hoc Query Over Hierarchical Marked-Up Data, filed on Sep. 26, 2014 by Zhen Hua Liu, et al., the entire contents of which are incorporated herein by reference.

Transactional Consistency

For the MF data to remain transactionally consistent with the PF data, transactions committed to PF data are reflected in MF data. According to an embodiment, to reflect committed changes in semi-structured data in PF form, the SSDM unit itself is not necessarily changed, but metadata is maintained to indicate what hierarchical data objects cached in the IMCU have been updated. Mechanisms for maintaining such metadata for MF data are described in U.S. Pat. No. 9,128,972, entitled "Multi-Version Concurrency Control On In-Memory Snapshot Store Of Oracle In-Memory Database", filed by Vivekanandhan Raja, et al. on Jul. 21, 2014, the contents of which are incorporated herein and referred to herein as the "Concurrency Control application".

In an embodiment, changes to rows in an IMCU are indicated by a "changed-row vector" that is maintained within the IMCU. For example, when a transaction performs an update to row R6, changed-row vector of IMCU 304 is updated by setting the bit that corresponds to row R6.

For a transaction that requires the most recent version of data items, a set bit in the changed-row bit vector indicates that the MF data for a row is stale, and therefore IMCU 304 cannot be used to evaluate a predicate for that row or return data from the row. Instead, PF-side evaluation is used to evaluate the predicate for that row.

However, not all transactions require the most recent version of data items. For example, in many DBMSs, transactions are assigned a snapshot time and return data that reflects the state of the database as of that snapshot time. Specifically, if a transaction is assigned a snapshot time of T3, then the transaction must be provided versions of data items that include all changes that were committed before T3, and no changes that were not committed as of T3 (except for changes that the transaction makes itself). For such transactions, a set bit in the changed-row bit vector does not necessarily indicate that the IMCU 304 cannot be used for a corresponding row.

In an embodiment, to account for the snapshot time of transactions that read values that are mirrored in IMCU 304, a snapshot invalid vector is created for each transaction that seeks to read data from an IMCU. A snapshot invalid vector is snapshot-time specific because bits in the snapshot invalid vector are only set for rows that were modified before the snapshot-time associated with the transaction for which the snapshot invalid vector is constructed. Generating and processing snapshot invalid vectors are described in further detail in the Concurrency Control application.

Predicate Evaluation with Transaction Consistency

To evaluate a predicate condition against column SSD C2 with transactional consistency with respect to a snapshot time of a query, Hashed posting index 651 may be used for any row that the respective snapshot invalid vector specifies is valid, that is, for any row for which the corresponding bit in the snapshot invalid vector is not set. For any row that the snapshot invalid vector specifies is invalid, PF-side evaluation is performed.

Figure 7:
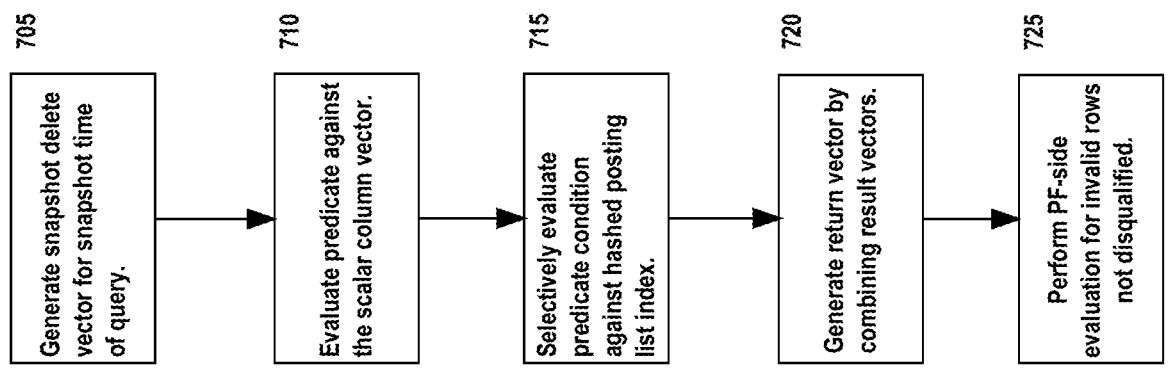
FIG. 7 depicts a procedure performed when evaluating a predicate against a posting index, according to an embodiment.

FIG. 7 is a flow chart depicting a procedure for evaluating a predicate condition against a query and a snapshot time. The procedure is illustrated using IMCU 304, the following predicate C1="SAN JOSE" AND JSON_EXISTS ($.CITIZENSHIP="USA") and snapshot invalid vector "0100". The snapshot invalid vector specifies that row R6 is invalid.

The procedure performs predicate evaluation on SSD C2 selectively to more efficiently evaluate a predicate against not only SSD C2 but a column vector for another column. Specifically, an equality predicate condition based on a scalar column vector can be evaluated more efficiently than a predicate condition on Hashed posting index 651. For a conjunctive predicate, once it has been determined that a row does not satisfy a predicate conjunct of the conjunctive predicate, the row cannot satisfy the predicate regardless of the result of evaluating another predicate conjunct of the predicate on the row. Therefore, evaluation of another predicate conjunct on the row disqualified by a previously evaluated predicate conjunct can be skipped in order to determine the evaluation result of the predicate, thereby reducing processing needed to evaluate a conjunctive predicate.

Referring to FIG. 7, at 705, snapshot invalid vector "0100" is generated. The snapshot invalid vector specifies that row R6 is invalid.

At 710, the predicate condition C1="SAN JOSE" is evaluated against column vector 324. Accordingly, the predicate conjunct is evaluated for rows R5, R7, and R8, yielding a result vector 1110. In an embodiment, a bit in a result vector is set to 1 for a row that passes predicate evaluation. As a result, when a bit in a result vector or return vector is set 0, that specifies that the respective row has been disqualified.

At 715, the predicate condition JSON_EXISTS ($.CITIZENSHIP="USA") is evaluated against Hashed posting index 651. The predicate is evaluated similarly to the example described in section PREDICATE EVALUATION BASED ON STRUCTURAL FEATURES. However, object-token-location lists for invalid rows or disqualified rows may be ignored. Row R8 was disqualified because row R8 did not satisfy the previous predicate conjunct evaluated. Accordingly, the predicate is evaluated for rows R5 and R7 using hashed posting index 651. The result vector generated equals 1100.

At 720, the generated result vectors are combined in an AND operation to generate a return vector. The return vector generated is 1100

At 726, PF-side evaluation is performed for the invalid rows that have not been disqualified. In the current illustration, the snapshot invalid vector specifies that row R6 is invalid. Therefore, PF-side evaluation is performed for row R6.

PF-Side Evaluation of Hierarchical Data Objects

Predicate evaluation of hierarchical data objects stored in PF form may or may not require a functional evaluation. For example, hierarchical data objects in SSD C2 in PF form are stored in binary streamable form. To evaluate operator CONTAINS against a hierarchical data object in a row, the hierarchical data object may be simply streamed to find the particular string required by the operator.

However, for predicate evaluation that requires functional evaluation, the functional evaluation requires a representation of hierarchical data objects that enables functional evaluation and/or enables more efficient functional evaluation. According to an embodiment of the present invention, an object-level posting index is generated for a hierarchical data object being evaluated by PF-side processing. The object-level posting index is in effect a posting index for a single hierarchical data object. The object-level posting index may be generated for any invalid row in a IMCU when performing PF-side predication evaluation.

FIG. 8 depicts an object-level posting index 801 for SSD C2 of row R6. Object-level posting index 801 shares many features of posting index 601, but does not have an object reference to a hierarchical data object because object-level posting index 801 only pertains to a single hierarchical data object.

Referring to FIG. 8, in object-level posting index 801, column Token contains tokens corresponding to field tokens and keyword tokens found in JSON object R6. Column Type contains token type for each entry. Column Token Location List contains for each entry one or more token locations for occurrences of the token for the entry.

Refreshing Hashed Posting Index

As mentioned in the Mirroring Application, an IMCU may be refreshed to keep the MF data therein in synch with PF data as a particular point in time. A hashed posting index may be refreshed by materializing the hashed posting index from scratch, which would require processing and parsing the JSON objects in all the rows for a IMCU.

To refresh a hashed posting index more efficiently, the hashed posting index may be refreshed incrementally by modifying the existing hashed posting index. Because the hashed posting index is a serialized structure, the hashed posting index may not be modified piecewise to reflect any changes to the JSON objects. Instead, a refreshed hashed posting index is formed from merging valid portions of an existing hashed posting index with a "delta posting index", a posting index formed for only the changed rows. To perform the incremental refresh, for each existing posting list index entry a sort merge is performed between any object-level-tag lists therein that are unchanged and any object-token-location lists in the corresponding posting list index in the delta posting index. It is important to note that within an posting list index entry the object-token-location lists are maintained in an order based on the object identifier to facilitate the sort merge.

Figure 9A:
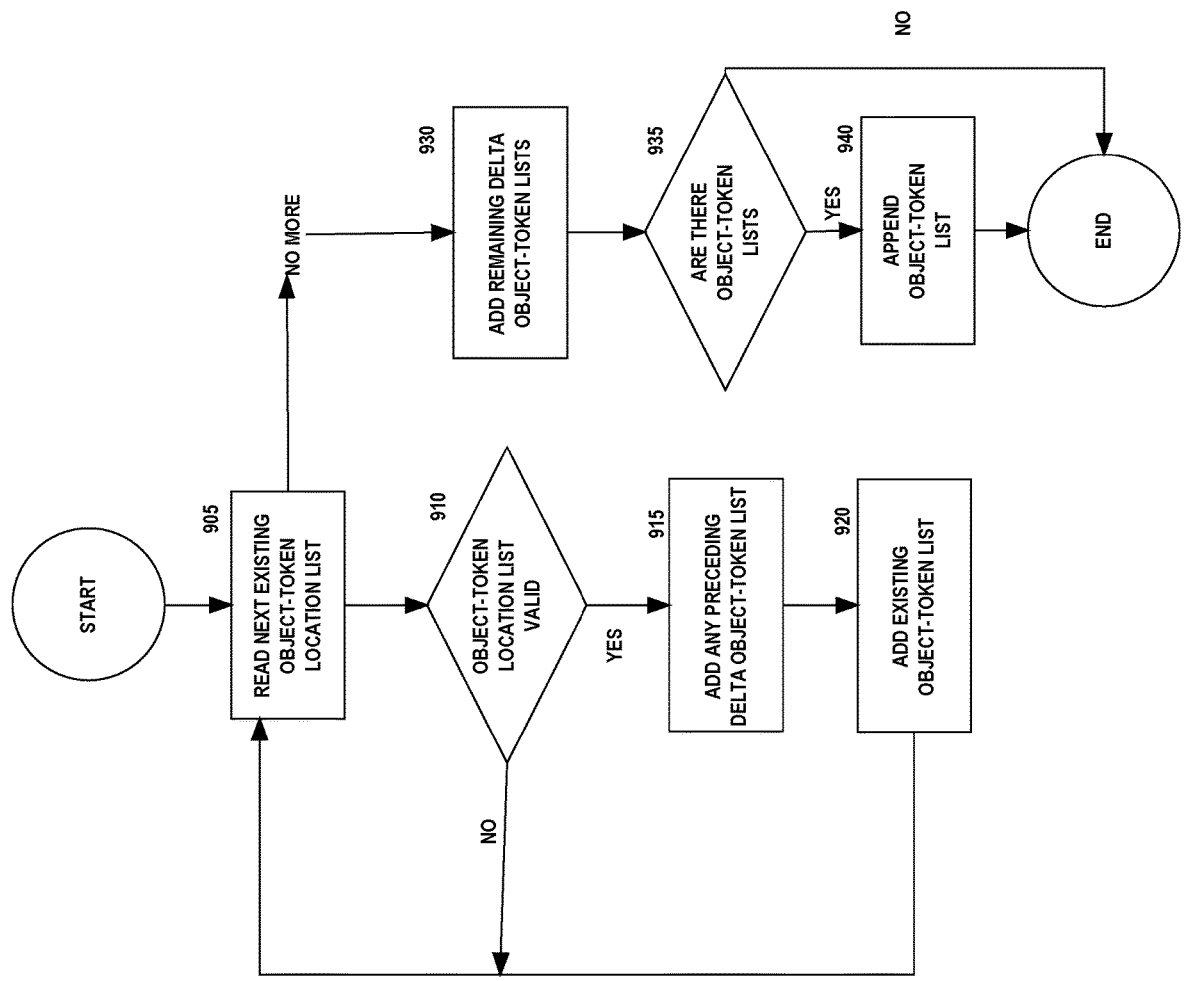
FIG. 9A depicts a procedure performed when incrementally updating a posting index in serialized hash table form, according to an embodiment.

FIG. 9A depicts a procedure for generating "refreshed posting list entries" for an incremental refresh of a hashed posting index. FIG. 9B depicts a delta posting index according to an embodiment of the present invention.

Referring to FIG. 9B, its depicts delta posting index 901, a posting list index for JSON objects in IMCU 304 that have been changed. Delta posting index 901 is structured similarly as posting index 601, except that delta posting index 901 only indexes JSON objects for rows R5 and R6, which have changed. The changed-row bit vector for IMCU 304 specifies that these rows have changed.

The procedure for generating refreshed posting list entries is performed for each posting list entry. In general, each existing posting list entry in each hash bucket is processed to form a refresh hashed posting index entry. The refreshed posting index entry is appended to the current version of the refresh hashed posting index being formed. As refreshed posting index entries are appended, delimiter and offsets are added, such as delimiters for the hash buckets and hashed posting index entries. The operation of adding the delimiters and offsets is not depicted in the FIG. 9A.

For each changed JSON object, delta posting index 901 indexes the entire JSON object, not just nodes that have been changed. With respect to the changes, the string JOHN has been changed to JACK in the JSON object for row R5. In the JSON object for row R6, string "USA" has been changed to "UK". The delta posting index 801 is index aligned. Hence, the object references therein are column vector indexes.

The procedure depicted in FIG. 9A is illustrated using hashed posting index 651 and delta posting index 901 to form a refreshed hashed posting index. The refreshed hashed posting index is not depicted. The illustration begins with the first posting index entry in HB0, the posting index entry for "USA".

Referring to FIG. 9A, at 905 the next existing object-token-location list from hashed posting index 651 is read. The next existing object-token-location list is (0, (6)(14)(21)), which is the first existing object-token-location list for "USA".

At 910, it is determined whether the next existing object-token-location list is valid. The changed-row vector specifies that the JSON object in row R5, which is indexed to 0, has not changed and is therefore valid.

At 915, any preceding delta object-token-location list for the corresponding posting index entry in delta posting index 901 is added to the forming refreshed hashed posting index. The object reference for the current next existing object-token-location list is 0. The corresponding posting index entry in delta posting index 901 contains one object-token-location list, which is (2,(6)), which has an object reference 2. Because the object reference 2 is greater 0, there is no preceding object-token-location list to add.

At 920, the next existing object-token-location list is appended to the refresh hashed posting index entry. At 905, the next existing object-token-location list (1, (6)) is read.

At 910, according to the changed-row vector, the object-token-location list is invalid. The object-token-location list is ignored. The procedure proceeds to 905. At 905, the next existing object-token-location list (3, (6)) is read.

At 915, any preceding delta object-token-location list for the corresponding posting index entry in delta posting index 901 is added to the refresh hashed posting index entry. The corresponding posting index entry contains one object-token-location list, which is (2,(6)), which has an object reference 2. Because the object reference 2 is greater than 3, the object-token-location list (2,(6)) is appended to the refresh hashed posting index entry.

At 920, the next existing object-token-location list is appended to the forming refreshed hashed posting index entry. At 905, the next existing object-token-location list (3, (6)) is read. At 910, based on the changed-row vector, it is determined that object-token-location list is valid. At 920, the next existing object-token-location list is appended to refresh hashed posting index entry.

At this point in the execution of the procedure, the refreshed object-token-location list is (0, (2-4)(10-12)(16, 19)) (2,(6)) (3, (6)). There are no more object-token-location lists in the existing posting index entry, therefore execution proceeds to 930.

At 930, any remaining object-token-location lists from the corresponding posting index entry in delta posting index 901 not yet appended are appended to the refreshed object-token-location list. There are none, so none are appended.

At 935, a determination is made of whether any object-token-location lists have been appended to the refreshed posting index entry. If not, then nothing is appended to the refreshed hashed posting index. However, object-token-location lists have been appended. Therefore, the refreshed object-token-location list is appended to the refreshed hashed posting index.

At the conclusion of reading the posting index entries within a hash bucket, there may be posting index entries for tokens that belong to the hash bucket but that not have been appended to the hash bucket. These posting index entries are appended to the refresh hashed posting index before proceeding to the next hash bucket, if any.

Unstructured Text Data

The approaches described herein for storing and querying SSDM may be used for unstructured-text data. Similar for SSDM, an IMCU may store unstructured-text data from a column in a posting list, except that the posting list does not need to include a type attribute to denote a type of token as keyword or tagname. Similarly, the object-level posting list and hashed posting index do not contain such a type attribute for a token. Transactional consistency, PF-side evaluation, hashed posting index refreshing are provided in a similar manner.

Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs.

Users interact with a database server of a DBMS by submitting to the database server commands that cause the database server to perform operations on data stored in a database. A user may be one or more applications running on a client computer that interacts with a database server. Multiple users may also be referred to herein collectively as a user.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

Generally, data is stored in a database in one or more data containers, each container contains records, and the data within each record is organized into one or more fields. In relational DBMSs, the data containers are typically referred to as tables, the records are referred to as rows, and the fields are referred to as columns. In object-oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node DBMS may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node DBMS hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node DBMS can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
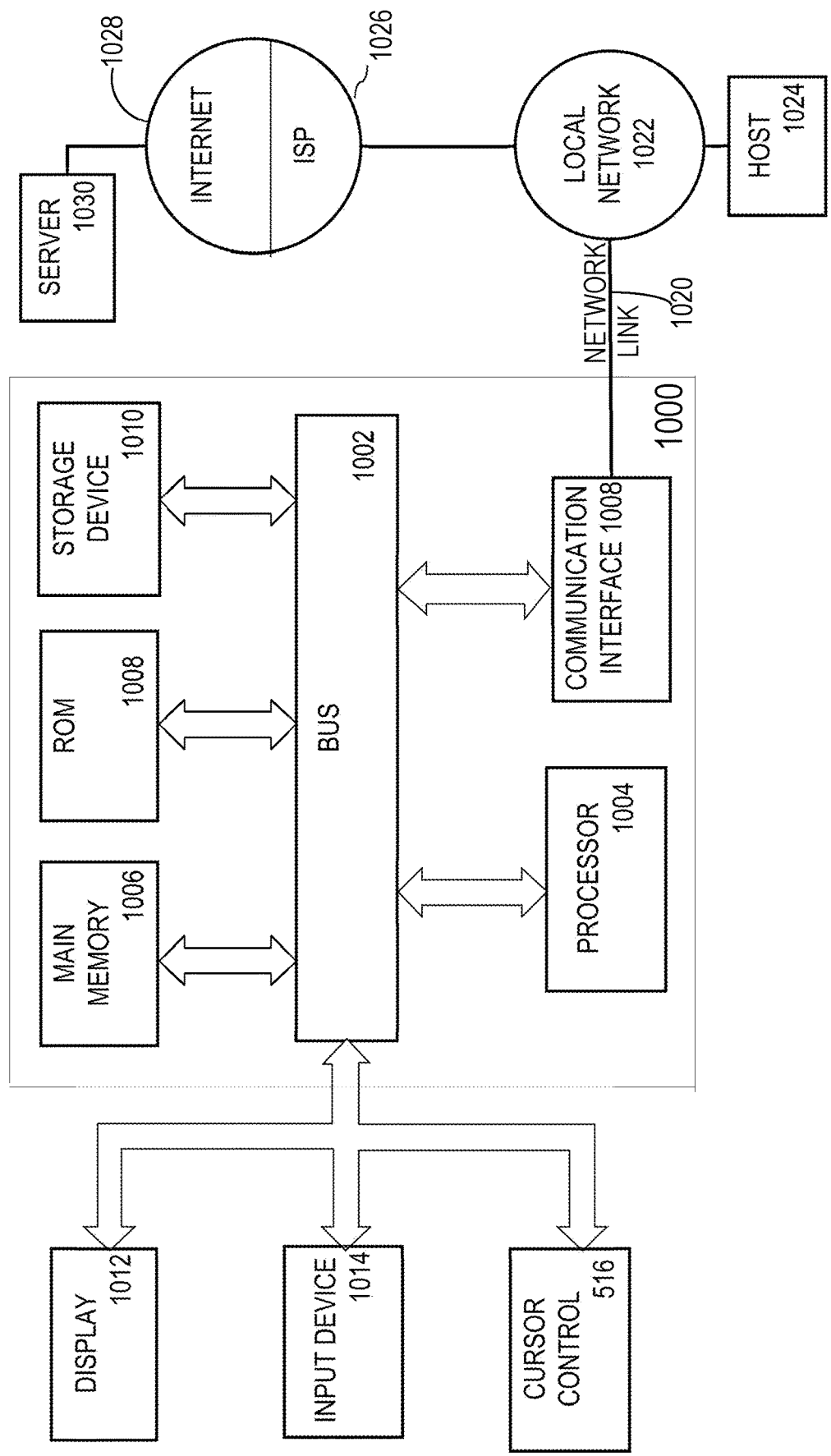
FIG. 10 is a diagram of a computer system that may be used to implement the techniques described herein, according to an embodiment.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid-state drive is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1010. Volatile media includes dynamic memory, such as main memory 1006. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid-state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Software Overview

Figure 11:
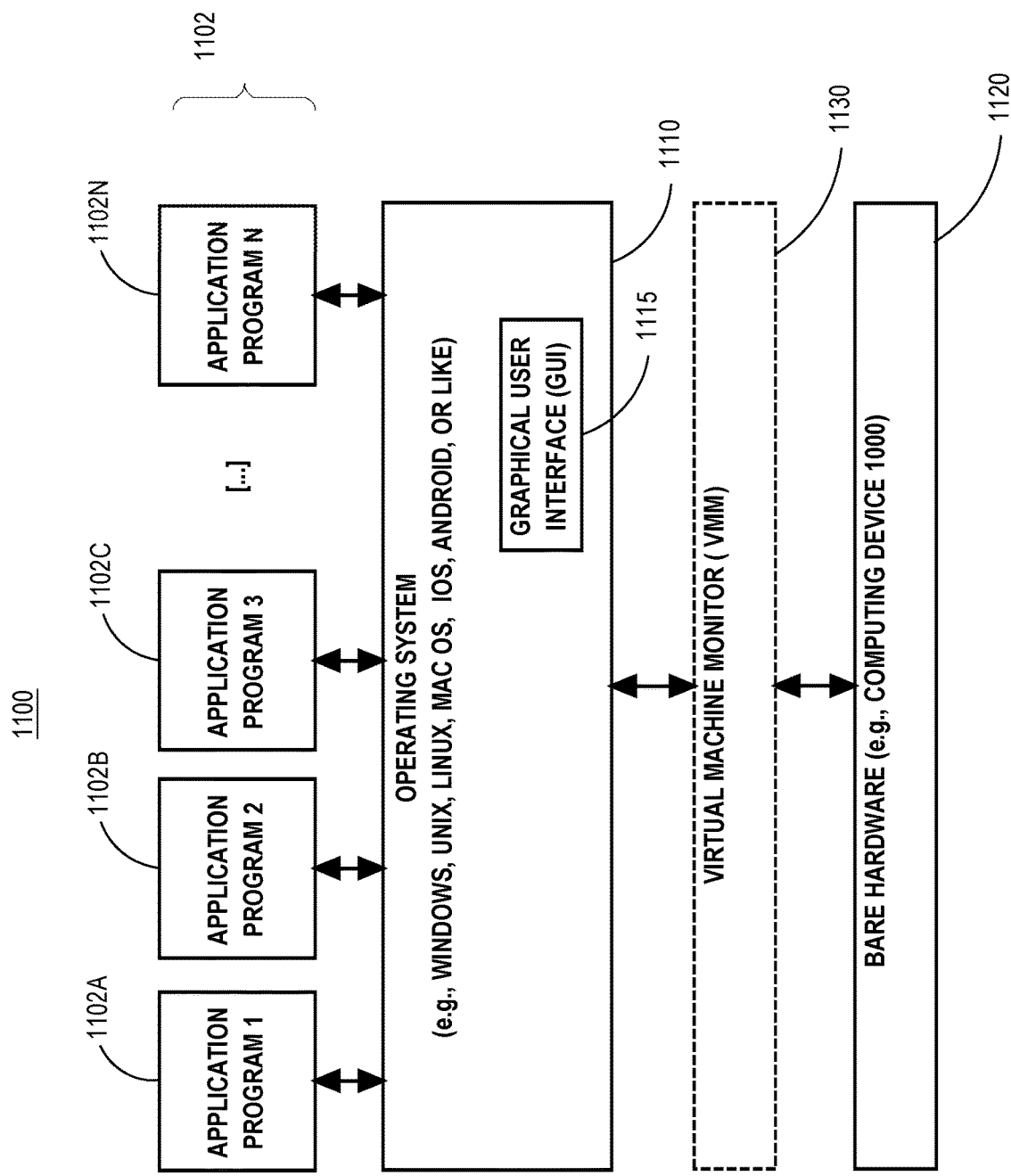
FIG. 11 is a diagram of a software system that may be employed for controlling the operation of a computing system, according to an embodiment.

FIG. 11 is a block diagram of a basic software system 1100 that may be employed for controlling the operation of computer system 1000. Software system 1100 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1100 is provided for directing the operation of computer system 1000. Software system 1100, which may be stored in system memory (RAM) 1006 and on fixed storage (e.g., hard disk or flash memory) 1010, includes a kernel or operating system (OS) 1110.

The OS 1110 manages low-level aspects of computer operation, including managing execution of processes, memory allocation, file input and output (I/O), and device I/O. One or more application programs, represented as 1102A, 1102B, 1102C . . . 1102N, may be "loaded" (e.g., transferred from fixed storage 1010 into memory 1006) for execution by the system 1100. The applications or other software intended for use on computer system 1000 may also be stored as a set of downloadable computer-executable instructions, for example, for downloading and installation from an Internet location (e.g., a Web server, an app store, or other online service).

Software system 1100 includes a graphical user interface (GUI) 1115, for receiving user commands and data in a graphical (e.g., "point-and-click" or "touch gesture") fashion. These inputs, in turn, may be acted upon by the system 1100 in accordance with instructions from operating system 1110 and/or application(s) 1102. The GUI 1115 also serves to display the results of operation from the OS 1110 and application(s) 1102, whereupon the user may supply additional inputs or terminate the session (e.g., log off).

OS 1110 can execute directly on the bare hardware 1120 (e.g., processor(s) 1004) of computer system 1000. Alternatively, a hypervisor or virtual machine monitor (VMM) 1130 may be interposed between the bare hardware 1120 and the OS 1110. In this configuration, VMM 1130 acts as a software "cushion" or virtualization layer between the OS 1110 and the bare hardware 1120 of the computer system 1000.

VMM 1130 instantiates and runs one or more virtual machine instances ("guest machines"). Each guest machine comprises a "guest" operating system, such as OS 1110, and one or more applications, such as application(s) 1102, designed to execute on the guest operating system. The VMM 1130 presents the guest operating systems with a virtual operating platform and manages the execution of the guest operating systems.

In some instances, the VMM 1130 may allow a guest operating system to run as if it is running on the bare hardware 1120 of computer system 1000 directly. In these instances, the same version of the guest operating system configured to execute on the bare hardware 1120 directly may also execute on VMM 1130 without modification or reconfiguration. In other words, VMM 1130 may provide full hardware and CPU virtualization to a guest operating system in some instances.

In other instances, a guest operating system may be specially designed or configured to execute on VMM 1130 for efficiency. In these instances, the guest operating system is "aware" that it executes on a virtual machine monitor. In other words, VMM 1130 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

What is claimed is:

1. A method comprising:
storing one or more tables in a persistent form, said one or more tables comprising a plurality of columns, said plurality of columns comprising a scalar column and a certain column that contains semi-structured data or unstructured-text data;
within an IMCU ("In Memory Compression Unit") stored in a RAM, storing a subset of rows that include said scalar column and said certain column, said subset of rows containing a plurality of hierarchical data objects in said certain column of said subset of rows;

wherein within said IMCU, said scalar column is stored in a column-major format and said certain column is stored in a representation that includes a posting index, said posting index mapping a plurality of tokens in said plurality of hierarchical data objects to token locations within said plurality of hierarchical data objects;

maintaining transactional consistency between said IMCU and said scalar column and said certain column stored in said persistent form in said one or more tables;

receiving a request to execute a database statement that requires predicate evaluation of a predicate against said certain column; and in response to receiving the request, evaluating said predicate using said IMCU, wherein evaluating said predicate includes evaluating a first predicate condition of said predicate against said posting index;

wherein said scalar column is stored in a column vector within said IMCU; and wherein said posting index includes a plurality of posting index entries that each map a token to one or more token locations within said plurality of hierarchical data objects;

wherein each posting index entry of said plurality of posting index entries includes a respective set of one or more lists, each respective set of one or more lists includes:
  an index of said column vector as an object reference to a respective hierarchical data object of said plurality of hierarchical data objects, and
  one or more token locations within said respective hierarchical data object;

generating a delta posting index that indexes a plurality of changed hierarchical data objects that have changed after loading said IMCU into said RAM;

wherein said delta posting index includes a plurality of delta posting index entries that each map a token to one or more token locations within said plurality of changed hierarchical data object;

wherein a particular delta posting index entry of said delta posting index entries includes a plurality of delta lists, each delta list of said plurality of delta lists including an index of said column vector as an object reference to a hierarchical data object of said plurality of hierarchical data objects;

generating a refreshed version of said posting index, wherein generating said refreshed version of said posting index comprises merging said delta posting index with said posting index.

2. The method of claim 1, wherein evaluating said predicate includes generating a first result vector representing the evaluation of said first predicate condition against said posting index, wherein generating said first result vector includes setting a particular bit corresponding to an index of said column vector that said posting index maps to a hierarchical data object of said plurality of hierarchical data objects.

3. The method of claim 2, wherein evaluating said predicate includes:
before generating said first result vector, generating another result vector representing the evaluation of a second predicate condition against said scalar column, wherein said another result vector sets another bit corresponding to a different index than an index corresponding to said particular bit;
wherein evaluating said first predicate condition includes foregoing fully evaluating said first predicate condition against a row indexed to the different index.

4. The method of claim 2, the method further including:
generating another result vector representing evaluation of a second predicate condition against said scalar column;
combining said first result vector and said another result vector by performing an AND operation between said first result vector and said another result vector to generate a third result vector.

5. The method of claim 1, the method further including:
wherein evaluating a first predicate condition of said predicate against said posting index includes evaluating said first predicate condition against a persistent form of a particular hierarchical data object of said plurality of hierarchical data objects stored in said certain column.

6. The method of claim 5, wherein said first predicate condition is based on a containment relationship, wherein evaluating said first predicate condition against a persistent form of a particular hierarchical data object includes generating a posting index for said particular hierarchical data object in response to determining that said first predicate condition is based on said containment relationship.

7. A non-transitory storage media storing sequences of instructions, said sequences of instructions, wherein execution of said sequences of instructions, by one or more computing devices causes:
storing one or more tables in a persistent form, said one or more tables comprising a plurality of columns, said plurality of columns comprising a scalar column and a certain column that contains semi-structured data or unstructured-text data;

within an IMCU ("In Memory Compression Unit") stored in a RAM, storing a subset of rows that include said scalar column and said certain column, said subset of rows containing a plurality of hierarchical data objects in said certain column of said subset of rows;

wherein within said IMCU, said scalar column is stored in a column-major format and said certain column is stored in a representation that includes a posting index, said posting index mapping a plurality of tokens in said plurality of hierarchical data objects to token locations within said plurality of hierarchical data objects;

maintaining transactional consistency between said IMCU and said scalar column and said certain column stored in said persistent form in said one or more tables;

receiving a request to execute a database statement that requires predicate evaluation of a predicate against said certain column; and in response to receiving the request, evaluating said predicate using said IMCU, wherein evaluating said predicate includes evaluating a first predicate condition of said predicate against said posting index;

wherein said scalar column is stored in a column vector within said IMCU; and wherein said posting index includes a plurality of posting index entries that each map a token to one or more token locations within said plurality of hierarchical data objects;

wherein each posting index entry of said plurality of posting index entries includes a respective set of one or more lists, each respective set of one or more lists includes:

an index of said column vector as an object reference to a respective hierarchical data object of said plurality of hierarchical data objects, and
one or more token locations within said respective hierarchical data object;
generating a delta posting index that indexes a plurality of changed hierarchical data objects that have changed after loading said IMCU into said RAM;
wherein said delta posting index includes a plurality of delta posting index entries that each map a token to one or more token locations within said plurality of changed hierarchical data objects;
wherein a particular delta posting index entry of said delta posting index entries includes a plurality of delta lists, each delta list of said plurality of delta lists including an index of said column vector as an object reference to a hierarchical data object of said plurality of hierarchical data objects;
generating a refreshed version of said posting index, wherein generating said refreshed version of said posting index comprises merging said delta posting index with said posting index.

8. The non-transitory storage media of claim 7,
wherein evaluating said predicate includes generating a first result vector representing the evaluation of said first predicate condition against said posting index, wherein generating said first result vector includes setting a particular bit corresponding to an index of said column vector that said posting index maps to a hierarchical data object of said plurality of hierarchical data objects.

9. The non-transitory storage media of claim 8, wherein evaluating said predicate includes:
before generating said first result vector, generating another result vector representing the evaluation of a second predicate condition against said scalar column, wherein said another result vector sets another bit corresponding to a different index than an index corresponding to said particular bit;
wherein evaluating said first predicate condition includes foregoing fully evaluating said first predicate condition against a row indexed to the different index.

10. The non-transitory storage media of claim 8, the sequences of instructions including instructions that, when executed by said one or more computing devices, causes:
generating another result vector representing evaluation of a second predicate condition against said scalar column;
combining said first result vector and said another result vector by performing an AND operation between said first result vector and said another result vector to generate a third result vector.

11. The non-transitory storage media of claim 7, the sequences of instructions including instructions that, when executed by said one or more computing devices, causes:
wherein evaluating a first predicate condition of said predicate against said posting index includes evaluating said first predicate condition against a persistent form of a particular hierarchical data object of said plurality of hierarchical data objects stored in said certain column.

12. The non-transitory storage media of claim 11, wherein said first predicate condition is based on a containment relationship, wherein evaluating said first predicate condition against a persistent form of a particular hierarchical data object includes generating a posting index for said particular hierarchical data object in response to determining that said first predicate condition is based on said containment relationship.

\* \* \* \* \*

UNITED STATES PATENT AND TRADEMARK OFFICE
CERTIFICATE OF CORRECTION

PATENT NO. : 11,226,955 B2
APPLICATION NO. : 16/022465
DATED : January 18, 2022
INVENTOR(S) : Liu et al.

Page 1 of 2

It is certified that error appears in the above-identified patent and that said Letters Patent is hereby corrected as shown below:

On the Title Page

On page 2, Column 2, item (56) under U.S. Patent Documents, Line 41, delete "2007/0022623" and insert -- 2007/0226237 --, therefor.

On page 3, Column 1, item (56) under Other Publications, Line 6, delete ""Intverted" and insert -- "Inverted --, therefor.

On page 4, Column 1, item (56) under Other Publications, Line 21, delete "Pattem/" and insert -- Pattern/ --, therefor.

On page 4, Column 2, item (56) under Other Publications, Line 6, delete "Sigmond," and insert -- Sigmod, --, therefor.

On page 4, Column 2, item (56) under Other Publications, Line 7, delete "Survery" and insert -- Survey --, therefor.

On page 4, Column 2, item (56) under Other Publications, Line 8, delete "Inernational" and insert -- International --, therefor.

On page 4, Column 2, item (56) under Other Publications, Line 19, delete "Largedata" and insert -- Large Data --, therefor.

On page 5, Column 1, item (56) under Other Publications, Line 4, delete "IMB," and insert -- IBM, --, therefor.

On page 5, Column 2, item (56) under Other Publications, Line 11, delete ""Understanding" and insert -- "Understand --, therefor.

On page 5, Column 2, item (56) under Other Publications, Line 21, delete "Oralce" and insert Signed and Sealed this
Thirty-first Day of May, 2022

Katherine Kelly Vidal
*Director of the United States Patent and Trademark Office*

-- Oracle --, therefor.

On page 5, Column 2, item (56) under Other Publications, Line 36, delete "tutoriais/" and insert -- tutorials/ --, therefor.

On page 5, Column 2, item (56) under Other Publications, Line 38, delete "Tips"; Chaper" and insert -- Tips", Chapter --, therefor.

On page 5, Column 2, item (56) under Other Publications, Line 40, delete "Buliding" and insert -- Building --, therefor.

In the Drawings

On sheet 8 of 16, in FIG. 5B, Line 9, delete "citizenship":"USA"}," and insert -- "citizenship":"USA"}, --, therefor.

In the Specification

In Column 16, Line 59, delete "not have" and insert -- have not --, therefor.

In the Claims

In Column 23, Line 40, in Claim 1, delete "object;" and insert -- objects; --, therefor.